United States Patent
Thrasher et al.

(10) Patent No.: US 10,380,621 B2
(45) Date of Patent: *Aug. 13, 2019

(54) TITLE-ACCEPTANCE AND PROCESSING ARCHITECTURE

(75) Inventors: Shannon Thrasher, Campbell, CA (US); Kevin Collins, Richmond (CA); Stefan Roever, Los Alto Hills, CA (US); Kevin Wray, San Carlos, CA (US); Alex F. Clark, San Jose, CA (US); Karl Ginter, Beltsville, MD (US)

(73) Assignee: API Market, Inc., San Mateo, CA (US)

( * ) Notice: Subject to any disclaimer, the term of this patent is extended or adjusted under 35 U.S.C. 154(b) by 1365 days.

This patent is subject to a terminal disclaimer.

(21) Appl. No.: 11/940,753

(22) Filed: Nov. 15, 2007

(65) Prior Publication Data
US 2008/0243693 A1 Oct. 2, 2008

Related U.S. Application Data

(60) Provisional application No. 60/865,983, filed on Nov. 15, 2006.

(51) Int. Cl.
*H04N 7/025* (2006.01)
*G06Q 30/02* (2012.01)

(52) U.S. Cl.
CPC .................. *G06Q 30/0241* (2013.01)

(58) Field of Classification Search
CPC .................. G06F 21/10; G06Q 30/241
(Continued)

(56) References Cited

U.S. PATENT DOCUMENTS 5,063,507 A 11/1991 Lindsey
5,455,407 A 10/1995 Rosen
(Continued)

FOREIGN PATENT DOCUMENTS

JP 02-245970 1/1990
JP 2001338242 A 12/2001
(Continued)

OTHER PUBLICATIONS

G. Ahn and J. Lam, "Managing Privacy Preferences for Federated Identity Management," in PROC. DIM ' 05: *Proceedings of the 2005 workshop on Digital Identity Management*, Fairfax, VA. ISA 2005, pp. 28-36.
(Continued)

*Primary Examiner* — Alexis M Casey
(74) *Attorney, Agent, or Firm* — Weaver Austin Villeneuve & Sampson LLP

(57) ABSTRACT

Methods and apparatus are described for facilitating donation of a digital asset from a user to an entity. A mechanism is provided by which the user may designate the digital asset to be donated. The mechanism is configured to receive at least a representation of the digital asset. A type of the digital asset is identified with reference to the received representation of the digital asset. Further processing of the received representation of the digital asset is effected with reference to the type. At least the representation of the digital asset is stored in a repository associated with the entity. A notification is provided to the user that ownership of the digital asset has been transferred to the entity.

17 Claims, 13 Drawing Sheets

(58) Field of Classification Search
USPC .......................................................... 705/51
See application file for complete search history.

(56) References Cited

U.S. PATENT DOCUMENTS

| | | | |
|---|---|---|---|
| 5,606,609 A | 2/1997 | Houser et al. | |
| 5,629,980 A | 5/1997 | Stefik | |
| 5,752,020 A | 5/1998 | Ando | |
| 5,778,182 A | 7/1998 | Cathey | |
| 5,794,217 A | 8/1998 | Allen | |
| 5,812,670 A * | 9/1998 | Micali | G06Q 20/0855 380/30 |
| 5,828,751 A | 10/1998 | Walker | |
| 5,857,023 A | 1/1999 | Demers et al. | |
| 5,892,900 A | 4/1999 | Ginter | |
| 5,903,880 A | 5/1999 | Biffar | |
| 5,905,976 A * | 5/1999 | Mjolsnes | G06Q 20/04 705/39 |
| 5,941,947 A | 8/1999 | Brown et al. | |
| 5,956,736 A | 9/1999 | Hanson et al. | |
| 6,065,117 A | 5/2000 | White | |
| 6,070,171 A | 5/2000 | Snyder et al. | |
| 6,078,909 A | 6/2000 | Knutson | |
| 6,098,056 A | 8/2000 | Rusnak et al. | |
| 6,119,229 A | 9/2000 | Martinez | |
| 6,141,006 A * | 10/2000 | Knowlton et al. | 705/26 |
| 6,154,214 A | 11/2000 | Uyehara | |
| 6,170,744 B1 | 1/2001 | Lee et al. | |
| 6,189,097 B1 | 2/2001 | Tyeksen, Jr. | |
| 6,205,436 B1 | 3/2001 | Rosen et al. | |
| 6,212,504 B1 | 4/2001 | Hayosh | |
| 6,292,788 B1 | 9/2001 | Roberts et al. | |
| 6,327,578 B1 | 12/2001 | Linehan | |
| 6,330,544 B1 | 12/2001 | Walker et al. | |
| 6,341,353 B1 | 1/2002 | Herman et al. | |
| 6,360,254 B1 | 3/2002 | Linden et al. | |
| 6,372,974 B1 | 4/2002 | Gross et al. | |
| 6,378,075 B1 | 4/2002 | Goldstein | |
| 6,389,541 B1 | 5/2002 | Patterson | |
| 6,519,573 B1 * | 2/2003 | Shade et al. | 705/26 |
| 6,574,609 B1 | 6/2003 | Downs | |
| 6,578,078 B1 | 6/2003 | Smith | |
| 6,587,867 B1 | 7/2003 | Miller et al. | |
| 6,591,260 B1 | 7/2003 | Schwarzhoff et al. | |
| 6,600,823 B1 | 7/2003 | Hayosh | |
| 6,629,081 B1 | 9/2003 | Cornelius | |
| 6,662,340 B2 | 12/2003 | Rawat | |
| 6,675,153 B1 | 1/2004 | Cook | |
| 6,751,670 B1 | 6/2004 | Patterson | |
| 6,772,341 B1 | 8/2004 | Shrader et al. | |
| 6,820,204 B1 | 11/2004 | Desai et al. | |
| 6,842,741 B1 | 1/2005 | Fujimura | |
| 6,868,392 B1 | 3/2005 | Ogasawara | |
| 6,871,220 B1 | 3/2005 | Rajan et al. | |
| 6,895,392 B2 | 5/2005 | Stefik et al. | |
| 6,898,576 B2 | 5/2005 | Stefik et al. | |
| 6,910,179 B1 | 6/2005 | Pennell | |
| 6,913,193 B1 | 7/2005 | Kawan | |
| 6,920,567 B1 | 7/2005 | Doherty et al. | |
| 6,925,439 B1 * | 8/2005 | Pitroda | 705/1.1 |
| 6,938,021 B2 | 8/2005 | Shear et al. | |
| 6,941,291 B1 | 9/2005 | Zoller et al. | |
| 6,944,776 B1 | 9/2005 | Lockhart et al. | |
| 6,947,556 B1 | 9/2005 | Matyas et al. | |
| 6,947,571 B1 | 9/2005 | Rhoads | |
| 7,003,670 B2 | 2/2006 | Heavan et al. | |
| 7,010,512 B1 | 3/2006 | Gillin | |
| 7,016,877 B1 | 3/2006 | Steele et al. | |
| 7,020,626 B1 | 3/2006 | Eng et al. | |
| 7,028,009 B2 * | 4/2006 | Wang | G06F 21/10 380/201 |
| 7,069,234 B1 | 6/2006 | Cornelius | |
| 7,069,310 B1 | 6/2006 | Bartholomew | |
| 7,099,849 B1 | 8/2006 | Reeder et al. | |
| 7,103,574 B1 | 9/2006 | Peinado et al. | |
| 7,120,606 B1 | 10/2006 | Ranzini et al. | |
| 7,130,829 B2 | 10/2006 | Banerjee et al. | |
| 7,191,332 B1 | 3/2007 | Pankajakshan et al. | |
| 7,249,107 B2 * | 7/2007 | Yaacovi | G06F 21/10 705/51 |
| 7,275,260 B2 | 9/2007 | de Jong et al. | |
| 7,318,049 B2 | 1/2008 | Iannacci | |
| 7,346,923 B2 | 3/2008 | Atkins | |
| 7,392,226 B1 | 6/2008 | Sasaki et al. | |
| 7,401,221 B2 | 7/2008 | Adent et al. | |
| 7,424,747 B2 | 9/2008 | DeTreville | |
| 7,426,492 B1 | 9/2008 | Bishop et al. | |
| 7,444,519 B2 | 10/2008 | Laferriere et al. | |
| 7,454,622 B2 | 11/2008 | Laidlaw et al. | |
| 7,580,877 B1 * | 8/2009 | Argenbright | 705/36 R |
| 7,614,078 B1 | 11/2009 | Stieglitz | |
| 7,680,819 B1 | 3/2010 | Mellmer et al. | |
| 7,707,066 B2 | 4/2010 | Roever | |
| 7,707,121 B1 | 4/2010 | Roever et al. | |
| 7,725,260 B2 | 5/2010 | Vos et al. | |
| 7,774,499 B1 | 8/2010 | Popek et al. | |
| 7,814,025 B2 | 10/2010 | Roever | |
| 8,170,929 B1 * | 5/2012 | Mallon | G06Q 30/06 705/1.1 |
| 8,566,461 B1 | 10/2013 | Jun et al. | |
| 8,571,992 B2 | 10/2013 | Roever et al. | |
| 8,738,457 B2 | 5/2014 | Roever et al. | |
| 9,177,338 B2 | 11/2015 | Collins et al. | |
| 9,509,704 B2 | 11/2016 | Roever et al. | |
| 9,621,372 B2 | 4/2017 | Roever et al. | |
| 10,073,984 B2 | 9/2018 | Roever et al. | |
| 2001/0008557 A1 | 7/2001 | Stefik et al. | |
| 2001/0026287 A1 | 10/2001 | Watanabe | |
| 2001/0032312 A1 | 10/2001 | Runje et al. | |
| 2002/0004847 A1 | 1/2002 | Tanno | |
| 2002/0026445 A1 | 2/2002 | Chica et al. | |
| 2002/0029183 A1 | 3/2002 | Vlahoplus et al. | |
| 2002/0032646 A1 | 3/2002 | Sweeney et al. | |
| 2002/0038278 A1 | 3/2002 | Himmelstein | |
| 2002/0040346 A1 | 4/2002 | Kwan | |
| 2002/0048369 A1 | 4/2002 | Ginter et al. | |
| 2002/0062249 A1 | 5/2002 | Iannaci | |
| 2002/0082961 A1 | 6/2002 | Abrahm et al. | |
| 2002/0091643 A1 | 7/2002 | Okamoto et al. | |
| 2002/0091646 A1 | 7/2002 | Lake et al. | |
| 2002/0099564 A1 | 7/2002 | Kim | |
| 2002/0106081 A1 | 8/2002 | Yang | |
| 2002/0116471 A1 | 8/2002 | Shteyn | |
| 2002/0128940 A1 | 9/2002 | Orrin et al. | |
| 2002/0129140 A1 * | 9/2002 | Peled | H04L 63/0245 709/224 |
| 2002/0143703 A1 | 10/2002 | Razvan et al. | |
| 2002/0147929 A1 | 10/2002 | Rose | |
| 2002/0152126 A1 | 10/2002 | Lieu et al. | |
| 2002/0152173 A1 | 10/2002 | Rudd | |
| 2002/0152262 A1 | 10/2002 | Arkin et al. | |
| 2002/0156743 A1 * | 10/2002 | DeTreville | G06Q 30/06 705/57 |
| 2002/0178082 A1 * | 11/2002 | Krause et al. | 705/26 |
| 2002/0184504 A1 | 12/2002 | Hughes | |
| 2002/0198843 A1 | 12/2002 | Wang et al. | |
| 2003/0004885 A1 | 1/2003 | Banerjee et al. | |
| 2003/0023561 A1 | 1/2003 | Stefik et al. | |
| 2003/0023564 A1 | 1/2003 | Padhye et al. | |
| 2003/0028489 A1 * | 2/2003 | Williamson | G06F 21/10 705/59 |
| 2003/0046093 A1 | 3/2003 | Erickson et al. | |
| 2003/0061566 A1 | 3/2003 | Rubstein et al. | |
| 2003/0079122 A1 | 4/2003 | Asokan et al. | |
| 2003/0084171 A1 | 5/2003 | de Jong | |
| 2003/0084302 A1 | 5/2003 | De Jong | |
| 2003/0093695 A1 | 5/2003 | Dutta | |
| 2003/0125965 A1 | 7/2003 | Falso | |
| 2003/0131048 A1 | 7/2003 | Najork | |
| 2003/0140003 A1 | 7/2003 | Wang et al. | |
| 2003/0140034 A1 | 7/2003 | Probst et al. | |
| 2003/0159043 A1 | 8/2003 | Epstein | |
| 2003/0182142 A1 | 9/2003 | Valenzuela et al. | |
| 2003/0196087 A1 | 10/2003 | Stringer et al. | |

(56) References Cited

U.S. PATENT DOCUMENTS

| | | |
|---|---|---|
| 2003/0200439 A1 | 10/2003 | Moskowitz |
| 2003/0208406 A1 | 11/2003 | Okamoto et al. |
| 2003/0217006 A1* | 11/2003 | Roever et al. ............ 705/50 |
| 2003/0220881 A1 | 11/2003 | Pirhonen et al. |
| 2003/0229593 A1 | 12/2003 | Raley |
| 2004/0034601 A1 | 2/2004 | Kreuzer |
| 2004/0039916 A1* | 2/2004 | Aldis et al. ............ 713/177 |
| 2004/0044627 A1 | 3/2004 | Russell |
| 2004/0044779 A1 | 3/2004 | Lambert |
| 2004/0054630 A1 | 3/2004 | Ginter et al. |
| 2004/0054915 A1 | 3/2004 | Jong et al. |
| 2004/0059678 A1* | 3/2004 | Stefik et al. ............ 705/51 |
| 2004/0083391 A1 | 4/2004 | de Jong |
| 2004/0113792 A1 | 6/2004 | Ireland et al. |
| 2004/0128546 A1 | 7/2004 | Blakeley |
| 2004/0133548 A1* | 7/2004 | Fielding ............ H04K 1/00 |
| 2004/0139207 A1 | 7/2004 | De Jong |
| 2004/0153552 A1 | 8/2004 | Trossen et al. |
| 2004/0177039 A1 | 9/2004 | Pincus et al. |
| 2004/0196981 A1 | 10/2004 | Nakano et al. |
| 2004/0199577 A1 | 10/2004 | Burd et al. |
| 2004/0221045 A1 | 11/2004 | Joosten et al. |
| 2004/0243517 A1 | 12/2004 | Hansen |
| 2004/0243819 A1 | 12/2004 | Bourne et al. |
| 2004/0267671 A1 | 12/2004 | Nonaka et al. |
| 2004/0267673 A1 | 12/2004 | Ballard et al. |
| 2005/0004875 A1 | 1/2005 | Kontio et al. |
| 2005/0010486 A1* | 1/2005 | Pandhe ............ 705/26 |
| 2005/0027804 A1 | 2/2005 | Cahill et al. |
| 2005/0033700 A1 | 2/2005 | Vogler |
| 2005/0038707 A1 | 2/2005 | Roever et al. |
| 2005/0038724 A1 | 2/2005 | Roever et al. |
| 2005/0091268 A1 | 4/2005 | Meyer |
| 2005/0091545 A1 | 4/2005 | Soppera |
| 2005/0096938 A1 | 5/2005 | Slomkowski et al. |
| 2005/0138374 A1 | 6/2005 | Zheng et al. |
| 2005/0177716 A1 | 8/2005 | Ginter et al. |
| 2005/0204168 A1 | 9/2005 | Johnston et al. |
| 2005/0234860 A1 | 10/2005 | Roever et al. |
| 2005/0246193 A1 | 11/2005 | Roever et al. |
| 2005/0247777 A1 | 11/2005 | Pitroda |
| 2005/0251452 A1* | 11/2005 | Roever et al. ............ 705/26 |
| 2005/0268115 A1 | 12/2005 | Barde et al. |
| 2005/0273805 A1* | 12/2005 | Roever et al. ............ 725/25 |
| 2005/0276413 A1 | 12/2005 | Neogi |
| 2006/0036447 A1 | 2/2006 | Roever et al. |
| 2006/0036548 A1 | 2/2006 | Roever et al. |
| 2006/0059070 A1* | 3/2006 | Petruck ............ 705/35 |
| 2006/0064373 A1* | 3/2006 | Kelley ............ 705/39 |
| 2006/0080592 A1 | 4/2006 | Alves de Moura et al. |
| 2006/0136987 A1 | 6/2006 | Okuda |
| 2006/0167815 A1 | 7/2006 | Peinado et al. |
| 2006/0170759 A1 | 8/2006 | Roever et al. |
| 2006/0174350 A1 | 8/2006 | Roever et al. |
| 2006/0179003 A1 | 8/2006 | Steele et al. |
| 2006/0259422 A1 | 11/2006 | Sutton et al. |
| 2007/0016533 A1* | 1/2007 | Fujimura ............ 705/65 |
| 2007/0087840 A1 | 4/2007 | Fayter et al. |
| 2007/0136694 A1 | 6/2007 | Friedman et al. |
| 2007/0157320 A1 | 7/2007 | Collins et al. |
| 2007/0162300 A1 | 7/2007 | Roever et al. |
| 2007/0208720 A1 | 9/2007 | Probst et al. |
| 2007/0233602 A1* | 10/2007 | Zweig ............ G06F 21/10 705/51 |
| 2007/0250453 A1 | 10/2007 | Sako et al. |
| 2007/0255965 A1 | 11/2007 | McGucken |
| 2007/0286076 A1 | 12/2007 | Roever et al. |
| 2007/0286393 A1 | 12/2007 | Roever et al. |
| 2008/0067230 A1 | 3/2008 | Silverbrook et al. |
| 2008/0148056 A1 | 6/2008 | Ginter et al. |
| 2008/0205850 A1 | 8/2008 | Collins et al. |
| 2008/0235043 A1 | 9/2008 | Goulandris et al. |
| 2009/0070218 A1 | 3/2009 | Farmanfarmaian |
| 2009/0119500 A1 | 5/2009 | Roth et al. |
| 2009/0193249 A1* | 7/2009 | Conrado ............ H04L 63/0823 713/156 |
| 2009/0193526 A1 | 7/2009 | Sweazey |
| 2009/0275402 A1 | 11/2009 | Backover et al. |
| 2009/0288012 A1 | 11/2009 | Hertel et al. |
| 2010/0161444 A1 | 6/2010 | Roever et al. |
| 2010/0162408 A1 | 6/2010 | Roever et al. |
| 2010/0257111 A1 | 10/2010 | Veugen et al. |
| 2010/0299718 A1 | 11/2010 | Roever et al. |
| 2011/0178861 A1 | 7/2011 | Georgi |
| 2011/0197285 A1 | 8/2011 | Ginter et al. |
| 2011/0296515 A1 | 12/2011 | Krstic et al. |
| 2012/0090018 A1 | 4/2012 | Padhye et al. |
| 2012/0198513 A1 | 8/2012 | Maida-Smith et al. |
| 2013/0036476 A1 | 2/2013 | Roever et al. |
| 2014/0019372 A1 | 1/2014 | Roever et al. |
| 2014/0236746 A1 | 8/2014 | Roever et al. |
| 2015/0026080 A1 | 1/2015 | Roever et al. |
| 2016/0048812 A1 | 2/2016 | Collins et al. |
| 2017/0083720 A1 | 3/2017 | Roever et al. |
| 2018/0019891 A1 | 1/2018 | Roever et al. |

FOREIGN PATENT DOCUMENTS

| | | |
|---|---|---|
| JP | 2002-140631 | 5/2002 |
| WO | WO 98/43211 | 10/1998 |
| WO | WO 01/11452 | 2/2001 |
| WO | WO 01/84906 | 11/2001 |
| WO | WO 2002/011033 | 2/2002 |
| WO | WO 03098398 | 11/2003 |
| WO | WO 2004/038567 | 5/2004 |
| WO | WO 2005/116841 | 12/2005 |
| WO | WO 2007/033005 | 3/2007 |
| WO | WO 2007/033055 | 3/2007 |
| WO | WO 2007/078987 | 7/2007 |
| WO | WO 2007/130416 | 11/2007 |
| WO | WO 2007/130502 | 11/2007 |
| WO | WO 2013/019519 | 2/2013 |

OTHER PUBLICATIONS

Alladin/Preview Systems, "HASP SL," Alladin/Preview Systems, 2004.

K. Bohrer and B. Holland, "Customer Profile Exchange (CPExchange) Specification," International Digital Enterprise Alliance, Inc., Version 1.0, Oct. 20, 2000.

D. Burdett. RFC 2801: Internet Open Trading Protocol. [Online]. Apr. 2000. Available: http://www.faqs.org/rfes/rfc2801.html.

Business.com. Preview Systems, Inc. Profile. [Online]. 2006. Available: http://www.business.com/directory/telecommunications/preview_systems_inc/profile.

Cover Pages. Internet Open Trading Protocol. [Online]. Dec. 2002. Available: http://xml.coverpages.org/otp.html.

Cover Pages. IETF Internet Open Trading Protocol Working Group Publishes RFC for Voucher Trading System . [Online]. May 2003. Available: http://xml.coverpages.org/ni2003-05-15-a.html.

Cover Pages. XML Voucher: Generic Voucher Language. [Online]. May 2003. Available: http://xml.coverpages.org/xmlVoucher.html.

B. Cox, J. Tygar, and M. Sirbu, "Netbill Security and Transaction Protocol," *First USENIX Workshop on Electronic Commerce*, Jul. 1995.

FlexTicket. [Online]. Available: http://info.isl.ntt.co.jp/flexticket/index.html.

K. Fujumura et al., "Requirements and Design for Voucher Trading System (VTS)", Mar. 2003, RFC3506, http://rfc.net/rfc3506.html.

K. Fujimura, Y. Nakajima, and J. Sekine, *XML Ticket: Generalized Digital Ticket Definition Language*. 1999.

K. Fujimura and Y. Nakajima, *General Purpose Digital Ticket Framework*.Boston, Mass.: 3rd USENIX Workshop on Electronic Commerce, 1998.

K. Fujimura, H. Kuno, M. Terada, K. Matsuyama, Y. Mizuno, and J. Sekine, *Digital ticket controlled digital ticket circulation*. USENIX, 1999.

(56) References Cited

OTHER PUBLICATIONS

K. Fujimura, M. Terada, and J. Sekine, "A World Wide Supermarket Scheme Using Rights Trading System," in *Proc. ICPADS '00: Proceedings of the Seventh International Conference on Parallel and Distributed Systems: Workshops*, Washington, DC, USA, 2000, p. 289.
M. Iguchi et al. Voucher Integrated C2B and C2C Trading Model. May, 2002. [Online]. Available: http://wwwconf.ecs.soton.ac.uk/archive/00000272/01/index.html.
T. Hardjono and J. Seberry, *Strongboxes for Electronic Commerce*. Oakland, Calif.: 2nd USENIX Workshop on Electronic Commerce, 1996.
A Jøsang, J. Fabre, B. Hay, J. Dalziel and S. Pope. "Trust Requirements in Identity Management." Australasian Information Security Workshop 2005.
M. Kumar, A. Rangachari, A. Jhingran, and R. Mohan, *Sales Promotions on the Internet*. Boston, Mass.: $3^{rd}$ USENIX Workshop on Electronic Commerce, 1998.
K. Matsuyama and K. Fujimura, "Distributed Digital-Ticket Management for Rights Trading System", Nov. 1999, $1^{st}$ ACM Conferences on Electronic Commerce.
G. Medvinksy and B. C. Neuman, *NetCash: A design for practical electronic currency on the Internet*. Proceedings of the First ACM Conference on Computer and Communications Security, Nov. 1993.
M. Mont, S. Pearson, P Bramhall "Towards Accountable Management of Identity and Privacy: Sticky Policies and Enforceable Tracing Services," Hewlett Packard, 2003.
OECD. (Jan. 27, 2006) OECD Guidelines on the Protection of Privacy and Transborder Flows of Personal Data [br] . [Online]. Available: http://www.oecd.org/document/18/0.2340.en_2649_201185_1815186_1_1_1_1.00.
G. Skinner, S. Han, and E. Chang, "A framework of privacy shield in organizational information systems," *Proceedings of Int'l Conference on Mobile Business*, 2005.
D. Stewart. The Future of Digital Cash on the Internet. [Online]. Available: http://www.arraydev.com/commerce/J1BC/9703-02.html.
M. Terada, H. Kuno, M. Hanadate, and K. Fujimura, *Copy Prevention Scheme for Rights Trading Infrastructure*, 2000.
M. Terada and K. Fujimura, RFC 4153: "XML Voucher: Generic Voucher Language," Network Working Group, Sep. 2005.
M. Terada. RFC 4154: Voucher Trading System Application Programming Interface. Sep. 2005. [Online]. Available: http://www.rfc-archive.org/getrfc.php?rfc=4154.
D. Weitzel "Liberty ID-WSF Implementation Guide" Draft Version 1.0-1.2, Liberty Alliance Project. 2004-2005.
"US Military exchanges now offer best-price guarentees," M2 Presswire. Conventry: Jun. 4, 1998. p. 1.
http://legalminds.lp.findlaw.com/list/cyberia-1/msg31650.html), Robert A. Hettinga, May 29, 2001.
http://www.nettime.org/Lists-Archives/nettime-1-0009/msg00214.html, Dr. Richard W. Rahn, Sep. 19, 2000.
Menezes et al., "Handbook of Applied Cryptography", 1997 CRC Press LLC, Section 1.7.
N. Szabo, "Contracts with Bearer" http://szabo.best.vwh.net/bearer_contracts.html, 12 pages (1997).
Kuno et al., "A Digital Ticket Circulation Architecture, 58th Conference Collected Papers (4)" , Information Processing Society of Japan, Japan, Mar. 11, 1999, pp. 4-295-4-296.
Office Action dated Oct. 3, 2008 from U.S. Appl. No. 11/094,784.
Office Action dated Sep. 15, 2009 from U.S. Appl. No. 10/873,841.
Office Action dated Mar. 27, 2009 from U.S. Appl. No. 11/096,284.
Office Action dated Feb. 25, 2008 from U.S. Appl. No. 10/873,840.
Final Office Action dated Dec. 3, 2008 from U.S. Appl. No. 10/873,840.
Office Action dated May 28, 2009 from U.S. Appl. No. 10/873,840.
JP Office Action dated Mar. 24, 2009 from JP Application No. 2004-505848.
Office Action dated Feb. 9, 2005 from U.S. Appl. No. 10/232,861.
Office Action dated Jul. 27, 2005 from U.S. Appl. No. 10/232,861.
Office Action dated Dec. 2, 2005 from U.S. Appl. No. 10/232,861.
Office Action dated Jun. 21, 2006 from U.S. Appl. No. 10/232,861.
Office Action dated Nov. 30, 2006 from U.S. Appl. No. 10/232,861.
Office Action dated Jun. 14, 2007 from U.S. Appl. No. 10/232,861.
Office Action dated May 15, 2008 from U.S. Appl. No. 10/232,861.
Final Office Action dated Dec. 5, 2008 from U.S. Appl. No. 10/232,861.
Office Action dated Jun. 24, 2009 from U.S. Appl. No. 10/232,861.
Office Action dated May 22, 2006 from U.S. Appl. No. 10/414,817.
Office Action dated Nov. 28, 2006 from U.S. Appl. No. 10/414,817.
Office Action dated Apr. 30, 2007 from U.S. Appl. No. 10/414,817.
Office Action dated Oct. 3, 2007 from U.S. Appl. No. 0/414,817.
Office Action dated Jun. 11, 2008 from U.S. Appl. No. 10/414,817.
Office Action dated Dec. 24, 2008 from U.S. Appl. No. 10/414,817.
Final Office Action dated Jun. 12, 2009 from U.S. Appl. No. 10/414,817.
Office Action dated Dec. 22, 2005 from U.S. Appl. No. 10/414,830.
Office Action dated Feb. 7, 2007 from U.S. Appl. No. 10/414,830.
Office Action dated Dec. 20, 2005 from U.S. Appl. No. 10/440,286.
Office Action dated Jul. 13, 2006 from U.S. Appl. No. 10/440,286.
Office Action dated Jan. 30, 2007 from U.S. Appl. No. 10/440,286.
Office Action dated Jun. 28, 2007 from U.S. Appl. No. 10/440,286.
Office Action dated Dec. 27, 2007 from U.S. Appl. No. 10/440,286.
Office Action dated Aug. 6, 2008 from U.S. Appl. No. 10/440,286.
Office Action dated Nov. 18, 2008 from U.S. Appl. No. 10/440,286.
Office Action dated Feb. 11, 2009 from U.S. Appl. No. 10/440,286.
Office Action dated Jan. 14, 2008 from U.S. Appl. No. 10/439,629.
Office Action dated Oct. 23, 2008 from U.S. Appl. No. 10/439,629.
Office Action dated Jan. 28, 2009 from U.S. Appl. No. 10/439,629.
Office Action dated Sep. 26, 2007 from U.S. Appl. No. 11/118,608.
Office Action dated May 14, 2008 from U.S. Appl. No. 11/118,608.
Office Action dated Nov. 10, 2008 from U.S. Appl. No. 11/118,608.
Final Office Action dated Apr. 16, 2009 from U.S. Appl. No. 11/118,608.
Office Action dated Mar. 16, 2009 from U.S. Appl. No. 11/146,399.
International Search Report and Written Opinion dated Feb. 16, 2006 from PCT Application No. PCT/US2005/021057.
Notification Concerning Transmittal of International Preliminary Report on Patentability dated Jan. 11, 2007 from PCT Application No. PCT/US2005/021057.
International Search Report dated Nov. 25, 2003 from PCT Application No. PCT/US03/15614.
European Office Action dated Oct. 27, 2008 from EP Application No. 03726905.7.
Chinese Office Action dated Dec. 26, 2008 from CN Application No. 03816746.8.
International Search Report and Written Opinion dated Sep. 16, 2008 from PCT Application No. PCT/US07/10560.
International Search Report & Written Opinion dated Dec. 7, 2007 from PCT Application No. PCT/US07/010708.
Notification Concerning Transmittal of International Preliminary Report on Patentability dated Nov. 13, 2008 from PCT Application No. PCT/US2007/010708.
International Search Report & Written Opinion dated Feb. 20, 2008 from PCT Application No. PCT/US06/48776.
Notification Concerning Transmittal of International Preliminary Report on Patentability dated Jul. 10, 2008 from PCT Application No. PCT/US2006/048776.
Office Action dated Dec. 14, 2009 from U.S. Appl. No. 10/232,861.
Notice of Allowance U.S. Appl. No. 10/414,817 dated Jan. 27, 2010.
Notice of Allowance and Issue Fee Due dated Dec. 24, 2009 from U.S. Appl. No. 10/440,286.
Notice of Allowance dated May 10, 2010, U.S. Appl. No. 10/439,629.
Office Action dated Aug. 24, 2009, U.S. Appl. No. 11/155,010.
Office Action dated May 26, 2010 U.S. Appl. No. 11/155,010.
Office Action dated Oct. 1, 2010, U.S. Appl. No. 12/716,089.
Office Action dated Oct. 4, 2010, U.S. Appl. No. 11/679,760.
Office Action dated Sep. 21, 2010, U.S. Appl. No. 11/645,139.
The UNIX Operating System: Mature, Standardized and State-of-the-Art, a white paper from Aug. 1997 downloaded from www.unix.org.

(56) References Cited

OTHER PUBLICATIONS

Software Requirements Specification template, 2002, section 2.4, Operating Environments, downloaded from www.processimpact. com.
Office Action dated Sep. 30, 2011, U.S. Appl. No. 12/850,454.
Office Action dated Sep. 27, 2011, U.S. Appl. No. 11/741,952.
Office Action dated Aug. 11, 2011, U.S. Appl. No. 11/742,253.
Final Office Action dated Aug. 23, 2011, U.S. Appl. No. 11/940,474.
Office Action dated Oct. 4, 2011, U.S. Appl. No. 12/717,007.
Office Action dated Jan. 5, 2012, U.S. Appl. No. 11/679,760.
Office Action dated May 2, 2012, U.S. Appl. No. 12/717,007.
Final Office Action dated May 21, 2012, U.S. Appl. No. 11/742,253.
Wikipedia—Hash Chain: http://en.wikipedia.org/wiki/Hash_chain, downloaded Feb. 27, 2011.
Lamport, "Password Authentication with Insecure Communication", Communications of the ACM, Nov. 1981, vol. 24, No. 11, pp. 770-772.
Office Action dated May 18, 2011, U.S. Appl. No. 12/716,089.
Final Office Action dated May 27, 2011, U.S. Appl. No. 11/679,760.
Office Action dated Jul. 13, 2011, U.S. Appl. No. 12/717,007.
Office Action dated Mar. 22, 2011, U.S. Appl. No. 11/741,952.
Final Office Action dated May 5, 2011, U.S. Appl. No. 11/645,139.
Office Action dated Nov. 29, 2010, U.S. Appl. No. 11/940,747.
U.S. Appl. No. 11/830,717, filed Jul. 30, 2007, Roever et al.
U.S. Appl. No. 14/339,325, filed Jul. 23, 2014, Roever et al.
U.S. Miscellaneous Communication dated Jun. 11, 2010 issued in U.S. Appl. No. 11/155,010.
U.S. Office Action dated Apr. 5, 2013 issued in U.S. Appl. No. 11/155,010.
U.S. Office Action dated Dec. 18, 2013 issued in U.S. Appl. No. 11/155,010.
U.S. Final Office Action dated Jul. 23, 2014 issued in U.S. Appl. No. 11/155,010.
U.S. Office Action dated Jul. 1, 2013 issued in U.S. Appl. No. 12/716,089.
U.S. Notice of Allowance dated Feb. 5, 2014 issued in U.S. Appl. No. 12/716,089.
U.S. Final Office Action dated Sep. 27, 2012 issued in U.S. Appl. No. 11/679,760.
U.S. Office Action dated May 20, 2013 issued in U.S. Appl. No. 11/679,760.
U.S. Final Office Action dated Feb. 26, 2014 issued in U.S. Appl. No. 11/679,760.
U.S. Office Action dated Jan. 5, 2015 issued in U.S. Appl. No. 11/679,760.
U.S. Office Action dated Dec. 20, 2005 issued in U.S. Appl. No. 10/440,286.
U.S. Advisory Action Before the Filing of an Appeal Brief dated May 28, 2009 issued in U.S. Appl. No. 10/440,286.
U.S. Notice of Allowance dated Jul. 8, 2013 issued in U.S. Appl. No. 12/717,007.
U.S. Final Office Action dated Aug. 31, 2012 issued in U.S. Appl. No. 12/850,454.
U.S. Office Action dated Sep. 23, 2014 issued in U.S. Appl. No. 12/850,454.
U.S. Office Action dated Oct. 18, 2013 issued in U.S. Appl. No. 11/741,952.
U.S. Final Office Action dated May 20, 2014 issued in U.S. Appl. No. 11/741,952.
U.S. Office Action dated Sep. 5, 2014 issued in U.S. Appl. No. 11/741,952.
U.S. Office Action dated Nov. 7, 2014 issued in U.S. Appl. No. 11/645,139.
U.S. Office Action dated May 22, 2013 issued in U.S. Appl. No. 13/558,238.
U.S. Final Office Action dated Feb. 28, 2014 issued in U.S. Appl. No. 13/558,238.
U.S. Office Action dated Nov. 5, 2014 issued in U.S. Appl. No. 13/558,238.
European Communication dated Oct. 19, 2006 issued in EP Application No. 03 72 6905.7.
European Office Action dated Nov. 6, 2008 issued in EP Application No. 03 72 6905.7.
European Office Action dated Apr. 9, 2010 issued in EP Application No. 03 72 6905.7.
PCT International Preliminary Report on Patentability and Written Opinion dated Nov. 4, 2008 issued in PCT/US07/10560.
European Extended Search Report dated Nov. 28, 2013 issued in EP 06 847 910.4.
PCT International Search Report and Written Opinion dated Jan. 17, 2013 issued in PCT/US2012/048182.
PCT International Preliminary Report on Patentability and Written Opinion dated Feb. 13, 2014 issued in PCT/US2012/048182.
"The OAuth 2.0 Authorization Protocol", (Abstract) draft-ietf-oauth-v2-28, Network Working Group, E. Hammer, Ed., Jun. 19, 2012, 48 pages.
Cobèna, (2003) "Thèse d'Informatique, spècialitè Algorithmique, Change Management of Semi-Structure Data on the Web", soutenue le Juin 26, 2003 par, Ecole Doctorale de l'Ecole Polytechnique, 228 pages.
Fielding, (Jan. 2000) "Architectural Styles and the Design of Network-based Software Architectures", University of California, Irvine, Dissertation, 90 pages.
Haller et al., (May 1996) "A One-Time Password System", Kaman Sciences Corporation, Network Working Group, Request for Comments 1938, Category: Standards Track, 18 pp.
Manasse ("Why Rights Management is Wrong (and What to Do Instead)", SRC Technical Note, Compaq System Research Center, Jan. 21, 2001, 7 pages).
Tilkov, Stefan, "A Brief Introduction to REST", posted on Dec. 10, 2007 at http://www.infoq.com/articles/rest-introduction, 10 pages.
U.S. Office Action dated Jun. 9, 2015 issued in U.S. Appl. No. 11/679,760.
U.S. Final Office Action dated Mar. 6, 2015 issued in U.S. Appl. No. 12/850,454.
U.S. Final Office Action dated Feb. 18, 2015 issued in U.S. Appl. No. 11/741,952.
U.S. Office Action dated Aug. 11, 2015 issued in U.S. Appl. No. 11/741,952.
U.S. Notice of Allowance dated Jul. 10, 2015 issued in U.S. Appl. No. 11/645,139.
U.S. Office Action dated Mar. 26, 2015 issued in U.S. Appl. No. 11/940,747.
U.S. Final Office Action dated Feb. 24, 2015 issued in U.S. Appl. No. 13/558,238.
U.S. Office Action dated Jul. 2, 2015 issued in U.S. Appl. No. 13/558,238.
U.S. Office Action dated Jul. 1, 2016 issued in U.S. Appl. No. 11/155,010.
U.S. Office Action dated Apr. 6, 2016 issued in U.S. Appl. No. 14/245,885.
U.S. Final Office Action dated Jan. 11, 2016 issued in U.S. Appl. No. 11/679,760.
U.S. Office Action dated Mar. 9, 2016 issued in U.S. Appl. No. 14/031,908.
U.S. Final Office Action dated Aug. 29, 2016 issued in U.S. Appl. No. 14/031,908.
U.S. Final Office Action dated Dec. 21, 2015 issued in U.S. Appl. No. 11/741,952.
U.S. Office Action dated Feb. 23, 2016 issued in U.S. Appl. No. 11/742,253.
U.S. Final Office Action dated Feb. 1, 2016 issued in U.S. Appl. No. 11/940,747.
U.S. Final Office Action dated Mar. 9, 2016 issued in U.S. Appl. No. 13/558,238.
U.S. Notice of Allowance dated Sep. 19, 2016 issued in U.S. Appl. No. 13/558,238.
U.S. Appl. No. 14/831,713, filed Aug. 20, 2015, Collins et al.
U.S. Office Action dated Aug. 31, 2015 issued in U.S. Appl. No. 11/742,253.
U.S. Final Office Action dated Feb. 22, 2017 issued in U.S. Appl. No. 11/155,010.

(56) References Cited

OTHER PUBLICATIONS

U.S. Final Office Action dated Nov. 17, 2016 issued in U.S. Appl. No. 14/245,885.
U.S. Office Action dated Jan. 10, 2018 issued in U.S. Appl. No. 14/245,885.
U.S. Office Action dated Feb. 9, 2017 issued in U.S. Appl. No. 14/031,908.
U.S. Office Action dated Oct. 12, 2016 issued in U.S. Appl. No. 12/850,454.
U.S. Final Office Action dated Jun. 19, 2017 issued in U.S. Appl. No. 12/850,454.
U.S. Notice of Allowance dated Jan. 20, 2017 issued in U.S. Appl. No. 11/741,952.
U.S. Office Action dated Oct. 27, 2017 issued in U.S. Appl. No. 15/448,473.
U.S. Office Action dated Jan. 26, 2018 issued in U.S. Appl. No. 11/742,253.
U.S. Office Action dated Dec. 29, 2016 issued in U.S. Appl. No. 14/831,713.
U.S. Final Office Action dated Jun. 15, 2017 issued in U.S. Appl. No. 14/831,713.
U.S. Office Action dated Dec. 29, 2016 issued in U.S. Appl. No. 11/940,747.
U.S. Final Office Action dated Oct. 6, 2017 issued in U.S. Appl. No. 11/940,747.
U.S. Office Action dated May 19, 2017 issued in U.S. Appl. No. 15/298,103.
Miller, Mark S. and Shapiro, Jonathan S. (2003) "Paradigm Regained: Abstraction Mechanisms for Access Control," *HP Laboratories*, Palo Alto, HPL-2003-222, 22 pages; to be published in and presented at ASIAN'03, Dec. 10-13, 2003, Mumbai, India [Downloaded on Jul. 12, 2017 from http://www.hpl.hp.com/techreports/2003/HPL-2003-222].
U.S. Office Action dated Sep. 13, 2018 issued in U.S. Appl. No. 12/850,454.
U.S. Final Office Action dated Jun. 5, 2018 issued in U.S. Appl. No. 15/448,473.
U.S. Final Office Action dated Aug. 15, 2018 issued in U.S. Appl. No. 11/742,253.
U.S. Notice of Allowance dated Sep. 12, 2018 issued in U.S. Appl. No. 14/831,713.
U.S. Notice of Allowance dated Sep. 11, 2018 issued in U.S. Appl. No. 11/940,747.
U.S. Corrected Notice of Allowance dated Sep. 25, 2018 issued in U.S. Appl. No. 11/940,747.
U.S.Notice of Allowance dated Jul. 2, 2018 issued in U.S. Appl. No. 15/298,103.
U.S. Appl. No. 16/100,658, filed Aug. 10, 2018, Roever et al.

\* cited by examiner

TITLE-ACCEPTANCE AND PROCESSING ARCHITECTURE

1 CROSS REFERENCE TO RELATED U.S. PATENT APPLICATIONS

This application claims priority under 35 U.S.C. 119(e) to U.S. Provisional Patent Application No. 60/865,983 filed on Nov. 15, 2006, the entire disclosure of which is incorporated herein by reference for all purposes.

This application is also related to U.S. patent application Ser. No. 11/742,253 filed on Apr. 30, 2007, the entire disclosure of which is incorporated herein by reference for all purposes.

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2007, Navio Systems Inc.

3 BACKGROUND OF THE INVENTION 3.1 Field of the Invention

The present invention provides systems, methods, and software for providing the capability to process electronic materials (including donations) of various kinds by transfer of digital materials, both anonymously and non-anonymously. The digital materials can include media, documents, programs, offers, or others, including title materials which represent digital bearer instruments that express at least one right, such as those produced commercially by Navio Systems Inc. of Cupertino, Calif.

3.2 The Related Art 3.2.1 Existing Mechanisms

Examples of existing mechanisms to enable donors to make donations to recipients include sending items such as checks, postal money orders, certificates, coupons, or other items through a postal mail system such as the U.S. Post Office or in person, performing credit card transactions in postal mail, over the phone or by way of internet transactions, and electronic funds transfers such as those done by bank or companies such as PayPal.

Sending checks, postal money orders, certificates, coupons or other items through a postal mail system is slow, often taking days to complete delivery, and can be expensive due to the need to pay for envelopes, boxes, or other shipping materials, as well as postage and possibly other services such as delivery confirmation. If a delivery confirmation service is not purchased, there is no confirmation that the donation has been received unless a separate mechanism, such as an acknowledgement letter, is used. When sending funds by way of check or money order it is not possible to remain anonymous, and sending cash is unwise and discouraged by some postal systems. To donate digital materials it is necessary to first create a transport medium for them, such as a CD, DVD, "thumb drive", or other portable digital medium.

Credit Card Transactions, whether done using written forms sent through a postal mail system, in a phone conversation, or over the Internet, involve some level of risk that the credit card information will be misused, and the transaction cannot be handled anonymously. Filling out forms, whether printed or on-line, can be time consuming and subject to error. The time required can be a disincentive to donating. Credit cards are only useful for transferring funds, and can only transfer funds to those with a prior arrangement with a credit card company that enables them to accept credit card payments (i.e., a "merchant account"). Use of such accounts can involve expense, often in the form of a percentage of each transaction going to the credit card company rather than to the account owner. To donate anything other than funds requires a third party who can accept a credit card payment and deliver the required item to the recipient, generally involving both additional time and additional expense. Credit cards do, however, inherently provide confirmation of the donation in the form of a periodic statement from the credit card company to the credit card owner specifying the date, amount, and recipient of each transaction.

Electronic Funds Transfers, such as those done by banks or companies such as PayPal, have many of the same disadvantages as credit cards. There is some risk of misappropriation of funds, though the companies that perform these transfers may insure users against such losses. Transfers are not anonymous. It can be time consuming to arrange such transfers, and only funds may be transferred. The recipient and the donor may both be required to have accounts with the same funds transfer company, and may also be required to have a bank account or credit card to act as the source or destination for the transfer. As with credit cards, the company doing the transfer will generally provide confirmation that the transfer has taken place.

What is lacking in the existing methods is a way to donate funds, a variety of digital materials, or the right to acquire other items, safely, quickly, easily, and inexpensively in a manner which allows the donor to remain anonymous if so desired, and which provides confirmation of the donation to all parties.

3.2.2 Enabling Technology

There are technologies available that can assist in providing donation methods that are safe, quick, easy and inexpensive to use, that allow for anonymity when desired, and which can provide confirmation of the transfer to all parties. These include, but are not limited to, titles, other Digital Bearer Instruments (DBIs), commerce processing systems for titles, "digital wallets", digital properties, or representations of rights to properties, and title materials embedded in digital media.

A title is a digital bearer instrument that expresses at least one right. Digital bearer instruments originated as digital representations of bearer instruments, and were popularized by digital cash. Title materials include title objects, portions of title objects, for example a specific right definition, a reference to a specific title or right, and independently validatable portions of title objects. A stub is one example of an independently validatible portion of a title. Title materials may also include specific instances of digital bearer instruments that may not directly include a specific right, but rather provide a reference to such a right. Titles are presented to title-enabled processes, computers, and devices, which use a presented title to operate on and/or facilitate redemption of rights expressed by each title. Titles employed by specific embodiments of the present invention are related to the title technologies provided by Navio Systems Inc., of Cupertino Calif.

Title technology, including various title processing arrangements, is described in U.S. patent application Ser. No. 11/742,253, filed Apr. 30, 2007, titled "Enhanced Title Processing Arrangement," and U.S. patent application Ser. No. 10/439,629, filed May 15, 2003, titled "Methods and Apparatus for Title Protocol, Authentication, and Sharing," the entire disclosures of both of which are incorporated herein by reference for all purposes. Such arrangements are effective for processing title materials.

4 SUMMARY OF THE INVENTION

The present invention provides methods and apparatus for enabling the transfer of digital materials such as, for example, title materials, between a donor and a recipient both anonymously and non-anonymously.

According to one class of embodiments, methods and apparatus are provided for facilitating donation of a digital asset from a user to an entity. A mechanism is provided by which the user may designate the digital asset to be donated. The mechanism is configured to receive at least a representation of the digital asset. A type of the digital asset is identified with reference to the received representation of the digital asset. Further processing of the received representation of the digital asset is effected with reference to the type. At least the representation of the digital asset is stored in a repository associated with the entity. A notification is provided to the user that ownership of the digital asset has been transferred to the entity.

According to another class of embodiments, methods and apparatus are provided for facilitating donation of a digital asset from a user to an entity. A mechanism is provided by which the user may designate the digital asset to be donated. The mechanism is configured to receive at least a representation of the digital asset and initiate transfer of ownership of the digital asset to the entity. A notification is presented to the user that the ownership of the digital asset has been transferred to the entity.

According to some embodiments, the representation of the digital asset is a digital bearer instrument representing at least one right relating to the digital asset.

According to various embodiments, the mechanism for designating the digital asset may vary. For example, in one set of embodiments, the mechanism is an object in a graphical user interface onto which the user may drag-and-drop a representation of the digital asset. According to another set of embodiments, the mechanism is accessed via a link in a graphical user interface, and includes at least one object by which the digital asset may be identified. According to still another set of embodiments, the mechanism employs one of electronic mail, a text message, an instant message, or an HTTP post.

The details of one or more embodiments of the invention are set forth in the accompanying drawings and the description below. Other features and advantages of the invention will be apparent from the description and drawings, and from the claims.

5 BRIEF DESCRIPTION OF THE DRAWINGS

6 DESCRIPTION OF SOME EMBODIMENTS OF THE INVENTION

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

6.1 Definitions

The following definitions are used throughout, unless specifically indicated otherwise:

| | |
|---|---|
| Donation | Any item sent to a collection mechanism, such as a Tip Jar. |
| Collection Method | A system for receiving donations, potentially classifying them, and potentially accepting transfer of some or all rights in them. |
| Digital Repository/ Wallet | A system for storing digital materials such that materials held may be removed or inspected, and new materials may be added. |
| UI | User Interface. The mechanism used by a software/hardware system for interacting with a user of the system. |

6.2 Overview

Figure 1:
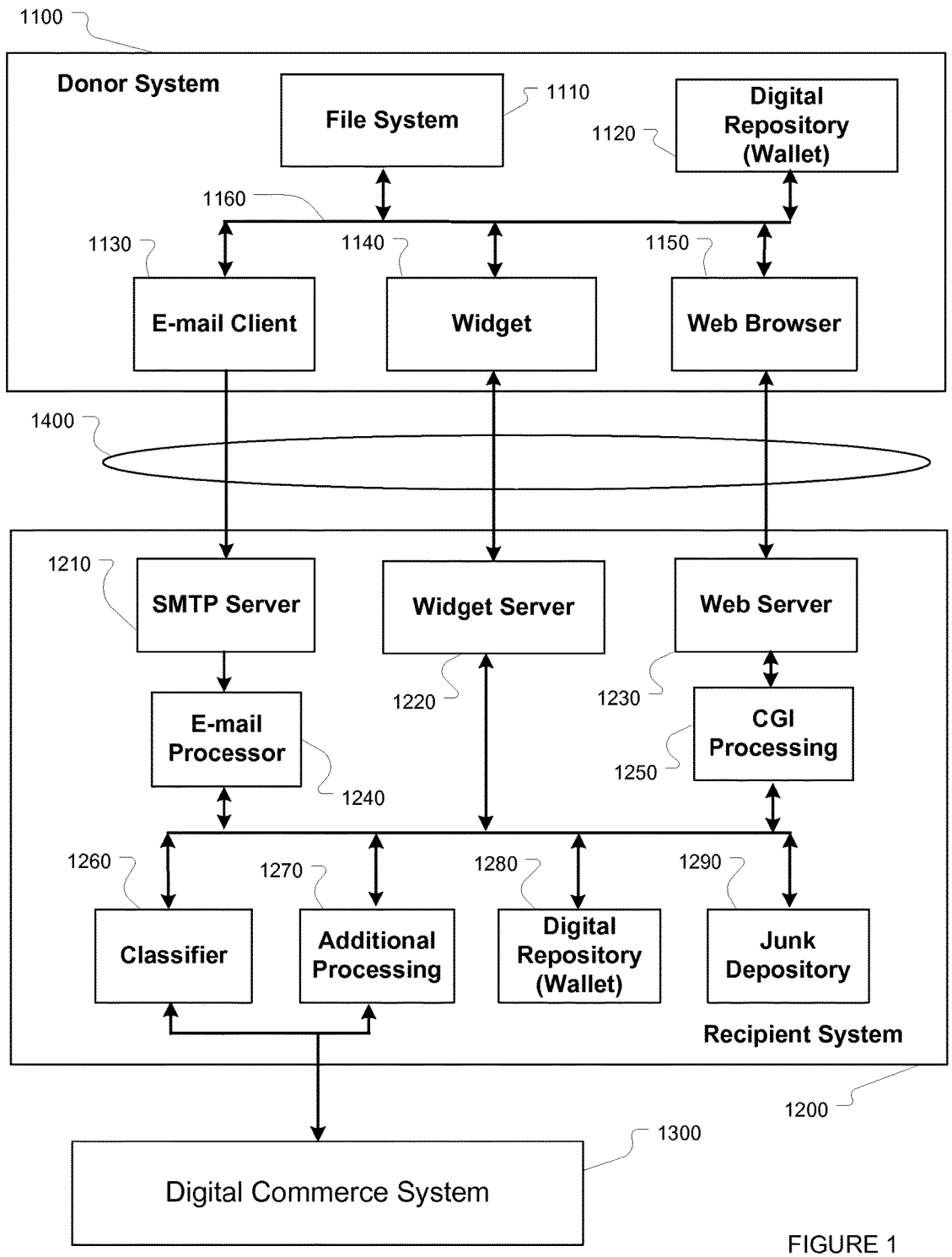
FIG. 1 is an example of a system for implementing methods of donation according to a specific embodiment of the invention.

As illustrated in FIG. 1, embodiments of the invention may be implemented in a system having a number of parts, both required and optional, which together act to enable the transfer of donations between donor and recipient, with optional classification and processing of donated items. These parts include, but are not limited to:

At least one extensible digital bearer-instrument based digital commerce system with optional components (1300).

A collection method—e.g., a web page, widget, email box, text message box, etc. (1130, 1140, 1150).

Something that permits a digital item to be transferred—e.g., a network, a peer-to-peer (P2P) connection, digital media physically transported from donor to recipient, etc. (1400).

An optional Classifier—something that identifies the type of a deposited item, and handles it appropriately (1260).

Optional converter/processor—converts input form to a form storable in a digital wallet, playable on a media device, etc. (1270).

A Digital wallet—a repository for digital items (1120, 1280).

A "Junk" Depository—an optional storage location for rejected, unrecognized, or otherwise questionable digital items (1290).

The extensible digital bearer instrument based Digital Commerce System (DCS) (1300) provides a mechanism for processing one or more title materials in accordance with the rights specified by the title materials. This system provides capabilities for creating, managing, validating, verifying, and exchanging digital titles and title materials and/or one or more of the rights expressed therein. This system forms the basis of the environment used by the current invention for managing the exchange of ownership of digitally donated items. In some embodiments, the donated materials are titles objects (also referred to herein as titles) or title materials. In other embodiments, the donated items include embedded title-materials in media files such as MP3, JPEG, and GIF files. The donated items which are not title objects, title materials, or which do not contain embedded title materials, do not require the existence of at least one DCS, but such items may be treated with more caution than those which do have (or reference) valid title objects and which are transferred according to the requirements of a DCS. Non-title items may be rejected as a matter of policy by some recipients.

One challenge of implementing a flexible collection and processing mechanism for digitally donated materials is the ability to flexibly configure one or more collection method(s), coupled with various transfer, identification/classification methods, converter/processor methods, and storage methods. The simplified examples given herein show a single linear configuration for collection, transfer, identification/classification, converter/processor, and storage methods. Implemented configurations are expected to be more complex, with a plurality of collection methods, for example, a plurality of web collection methods in a facebook page, a web collection method in a mySpace page, an IM collection method that interacts with IM systems, and an email collection method associated with one or more well known email addresses. Each of these collection methods are associated with transfer, identification/classification, and converter/processor methods appropriate for identifying and classifying the donated materials, converting and/or processing them appropriately, and making them available for storage using an appropriate storage method. Movement of donated materials between each component is performed by one or more appropriate instances of a transfer method. The transfer method used may vary from the method used by the collection method to collect the donated materials, so that a web-based widget can transfer the donated materials using IM for further processing, or an IM-based collection method can use an email-based transfer to forward the donated materials for further processing.

The described architecture permits the integration of each of these components in a modular manner, and provides a rule-based framework within which to configure the various components. Many variations of topologies are envisioned, including linear arrangements of components (such as described herein), hierarchical arrangements of components, and recursive/circular arrangements. Recursive/circular arrangement are particularly advantageous when a title is donated, and the processing of the title results in the title being redeemed for another digital item. The resulting digital item can then be re-processed by the architecture (perhaps taking a different processing path) without requiring additional complexity in the processing system.

The described architecture also permits the construction of forwarding/outsourced arrangements where one or more aspects of the receiving, identification/classification, processing/conversion, and/or storage are provided by differing providers.

Thus, a widget-based collection method can be configured using a rule that forwards all received materials using email (see rules, below), whilst another implementation of the widget-based collection method can be configured to locally identify, classify, and process all received items. The advantages of this configuration flexibility will be apparent to the those of skill in the art.

The collection method may include any system, program, method or procedure for interacting with one or more DCS, donated items, the method used to transport the donated items, or the system which receives the donated items. This may be a system which includes a web browser (1150), a web server (1230) and associated web pages and supporting software components, such as components produced using any technology related to ActiveX, JavaScript, Java, or Flash (1250). Alternatively, it may be a standalone program on each system (1140, 1220), an e-mail system that permits the sending and receiving of messages with associated digital materials (1130, 1210, 1240), or any other method which is determined to be appropriate by those having skill in the art. In one implementation, the user input mechanism is a Widget which is run when a user visits a web page which includes the Widget. The Widget allows a donor to drag an item to be donated from a first storage location, such as his Digital Wallet (1120), or other storage location (1110), and "drop" it on the Widget. The Widget accepts the digital item, and transfers the digital item to an associated server program running on the server host (1220), or at another location. The server program (1220) receives the donated item, and processes or stores it as appropriate based on design and configuration settings. In some implementations, this Widget and associated back-end processing system is referred to as a "digital tip jar." In an alternate implementation, the user input mechanism is an instant messaging software that accepts transfer requests from users who send items to a person. The IM software accepts the digital item, and transfers the digital item to an associated server program running on the server host (1220), or at another location. In yet another alternative implementation, the user input mechanism is an e-mail software that accepts digital items encoded within an email. The email software recognizes the digital item in the email, and transfers the digital item to an associated server program running on the server host (1220), or at another location.

The transfer mechanism (1400) can be any appropriate system capable of transporting digital materials from the donor to the recipient. This may include an Internet connection (e.g. a TCP or UDP connection between host ports), a Peer-To-Peer connection (e.g. a Bluetooth, USB or other wireless or wired link between donor system and recipient system), or the physical transport of storage media between donor and recipient (e.g. thumb drive, CD or floppy disc). The methods and procedures of transfer are determined by the design of the DCS, and can involve a simple transfer of the digital materials including digitally encoded media files such as pictures, music, or video, Digital Bearer Instruments, such as digital cash, title objects, title materials, and/or can involve modification or additions to title materials associated with the materials, for example, to reference the transfer of ownership of some or all of the rights expressed by the title materials, where such modification or additions are appropriate.

The optional Classifier (1260) is used to classify the donated item by type so that each type of donated item may be treated appropriately. In implementations where this is not required or desired, Classifier capabilities can be omitted or disabled and all types of materials handled regardless of type. In systems where classification is included and desired, the Classifier is used to identify the type of the donated item. In some implementations, a plurality of classifiers can be used. For example, a first classifier can be used to identify and/or classify music files, a second classifier can be used to identify and/or classify video files, a third classifier can be used to identify/classify title objects, and so on.

Identification of donated item type can be done based on various factors, such as the filename, or a sub-part of the filename, of the item, specific content of the item, structure of the item, status codes returned by other software that parses the item, or other mechanisms as determined to be appropriate by those having skill in the art. In one implementation the Classifier can classify items based on the format of the associated data.

Examples of the types that such a Classifier might use to classify an item can include, but are not limited to, JPEG, MPEG, PNG, GIF, MP3, EXE, TXT, DOC, WAV, or "unknown". In another implementation the Classifier can classify items based on the use for which the associated data is intended. Examples of the types that such a Classifier might use to classify an item can include, but are not limited to, sound, image, movie, text, program, digital cash, title object, DBI, or unknown. In yet another implementation the Classifier can classify items based on the program or method that is used to process the item. Examples of the types that such a Classifier might use to classify an item can include, but are not limited to, a reference to a program or system which can process the item for a user, such as "media player", "Digital Wallet", "image viewer", "MP3 Player", a Digital Commerce System URI, the URI of a system that can redeem a coupon, or "unsupported". In still another implementation the Classifier can classify items based on the kind of title materials that are associated with the item. Examples of the types that such a Classifier might use to classify an item can include, but are not limited to, a title object, title materials, a reference to a title object, a title stub, a Digital Bearer Instrument other than a title object, or "none". In a last implementation, the Classifier can classify an item by more than one classification method, on an as-needed basis, or more than one classification method at a time as determined to be appropriate by those having skill in the art.

One of the challenges of flexibly recognizing, classifying, converting, and processing donated digital materials is the flexible specification of rules that govern how the digital materials should be identified, classified, and/or processed. In particular, one of the challenges of identifying and classifying donated items is to identify and/or classify items in ways that are meaningful to the recipient of the donated item. Each recipient can have differing rules and can make these rules available to one or more classifiers and/or converter/processor application components.

In some implementations, the identification and classification steps are controlled using one or more "rules" that describe an aspect of the item to be identified and classified. The rules can be hard coded into the classifier (1260), managed externally to the classifier software as an independent database, or can be provided by a service. Alternatively, the rules can be provided as part of processing environment, such as one provided by an Active Viewer (AV) viewer application developed by Navio Systems Inc. of Cupertino, California. Rules can be encoded using any encoding mechanism. One example encoding mechanism is "pattern", "result" encoding, as shown below:

```
"Filename=*.pdf","PDFClassifier.exe"
"Mime=X-Navio/X-title". "https://TitleProcessor?Right=Redeem"
"*", "mailto:foo@domainname.here"
"", "delete"
```

In the above example rules, the first rule describes an identification/classification rule that pattern matches based upon a filename pattern, e.g. "*.pdf". This rule specifies that all files in which the filename matches the wildcard pattern "*.pdf" should be processed using the "PDFClassifier" application. The grammar and specification of the pattern and application component(s) is implementation dependent, and may include such implementation dependent information such as DCOM component IDs, JAVA method names, Service calls/references, URI's of service components, and other implementation dependent information. The examples provided herein are exemplary and have been simplified for easy understanding.

A second example rule describes a converter processor rule that pattern matches upon a MIME type, in this case, the mime type and subtype of X-Navio/X-title. Upon matching, the rule specifies that all objects which match the specified mime type will be processed by the "title processor" application using the optionally specified right of "redeem." Again, the grammar and specification of pattern and the converter/processor application is implementation dependent.

A third example rule describes a pattern that matches all items, and forwards the items as an email message.

A fourth example rule provides a "delete" rule that matches an empty pattern.

The optional Converter/Processor (1270) is used to provide conversion or other processing of received items. In implementations where this is not required or desired, Converter/Processor capabilities can be omitted or disabled. In systems where Conversion/Processing is included and desired, the Converter/Processor is used to provide appropriate Conversion/Processing of received items. In systems where Classification is implemented and enabled, this Conversion/Processing can be different for different types of item. Non-limiting examples of Conversion can include conversion of line terminators in text files to the format used on the receiving system, conversion of various image formats to a single format, conversion of WAV or AU sound files to MP3 format, or redemption of digital bearer instruments representing funds with the proceeds deposited in an account belonging to the recipient. Non-limiting examples of Processing can include copying the received digital materials to backup storage locations, notification of the user that one or more items have been received, software virus scanning and elimination, or automatic rejection and/or deletion of some classifications of items.

Rejected, unknown, or other classes of items can be deleted, or they can be stored in a "Junk" depository (1290) for later review.

The Digital Wallet (1280) represents an example of a repository used to store received items. In various implementations this can, without limitation, include a file system directory or set of directories, a standard or proprietary database system, a specialized hardware/software system, or various methods and storage locations as determined by the type of the item to be stored. The Digital Wallet or its associated software, hardware, and methods and procedures allows the storage of new items, the removal of items to be transferred, used, modified or destroyed, and a determination of what items it contains. The Digital Wallet may have other capabilities, such as encryption of stored items, as determined to be appropriate by those having skill in the art.

7 EXAMPLES

Although various specific embodiments and examples are described herein, those having ordinary skill in the art will understand that many different implementations of the invention can be achieved without departing from the spirit or scope of the invention. The embodiments and examples described herein should therefore not be used to limit the scope of the invention.

7.1 Network Widget Facilitating Use of Digital Bearer Instruments

This embodiment describes an application widget that permits users to leave "tips" using title materials or other digital materials. This mechanism and use of titles and title materials is digitally analogous to a "tip basket" provided by street performers and other service staff. Several embodiments are described herein.

Figure 2:
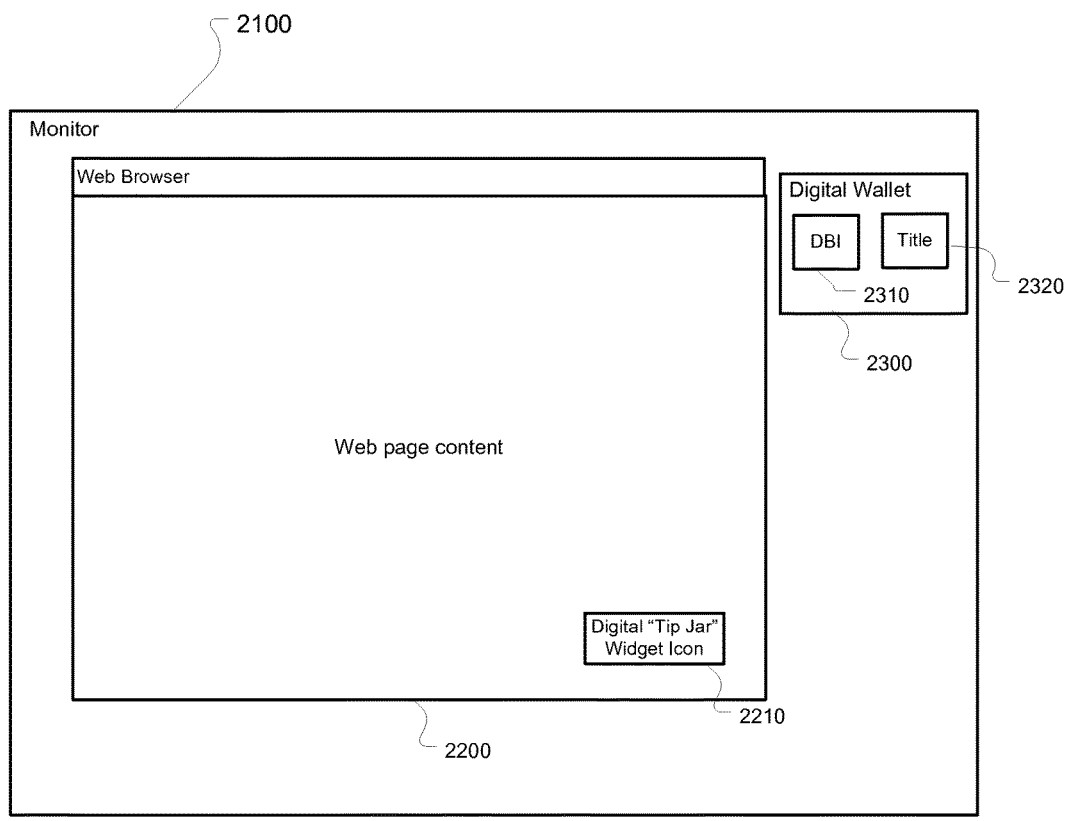
FIG. 2 is an example of a solicitation screen using a Digital "Tip Jar" widget, requesting the user to give a gratuity if they like the site content.
Figure 3:
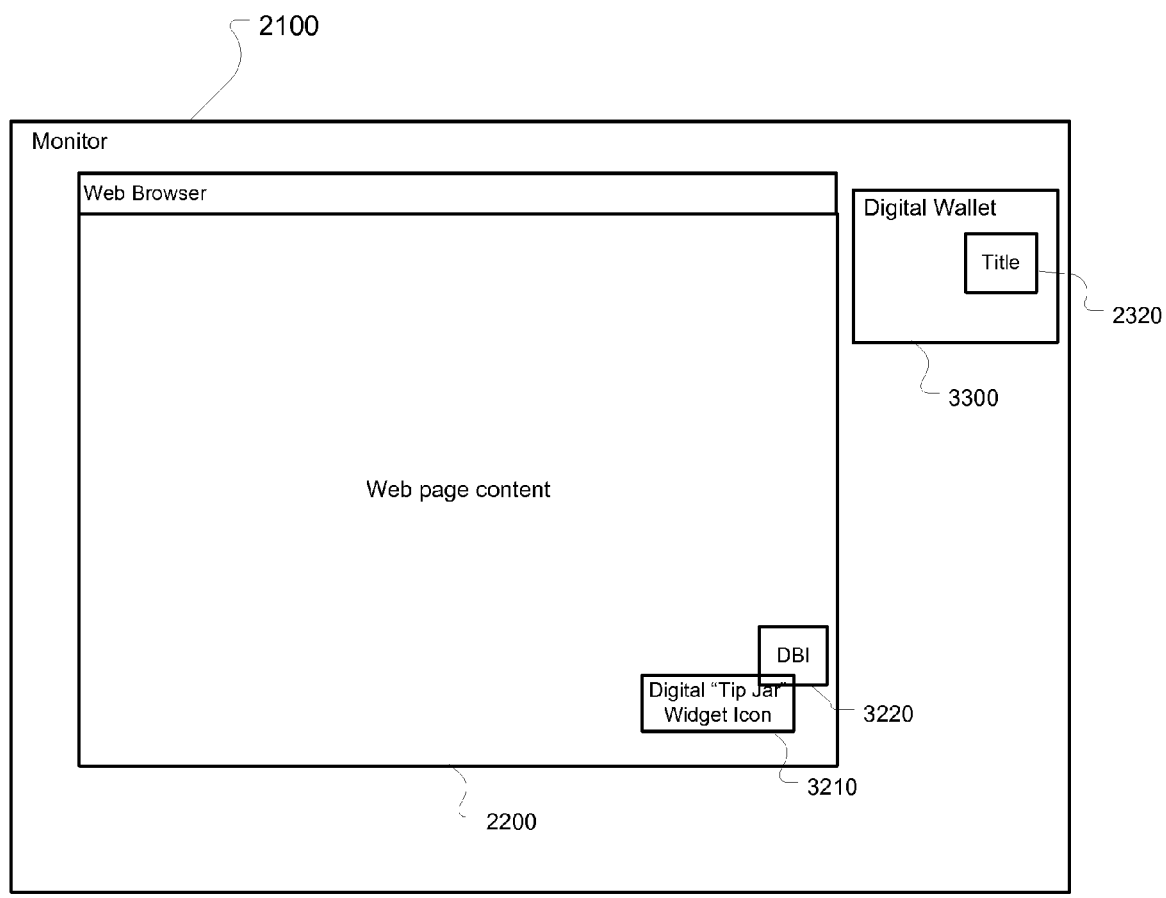
FIG. 3 is an illustration of a user dragging a donation from a digital wallet onto a Digital "Tip Jar" widget.
Figure 4:
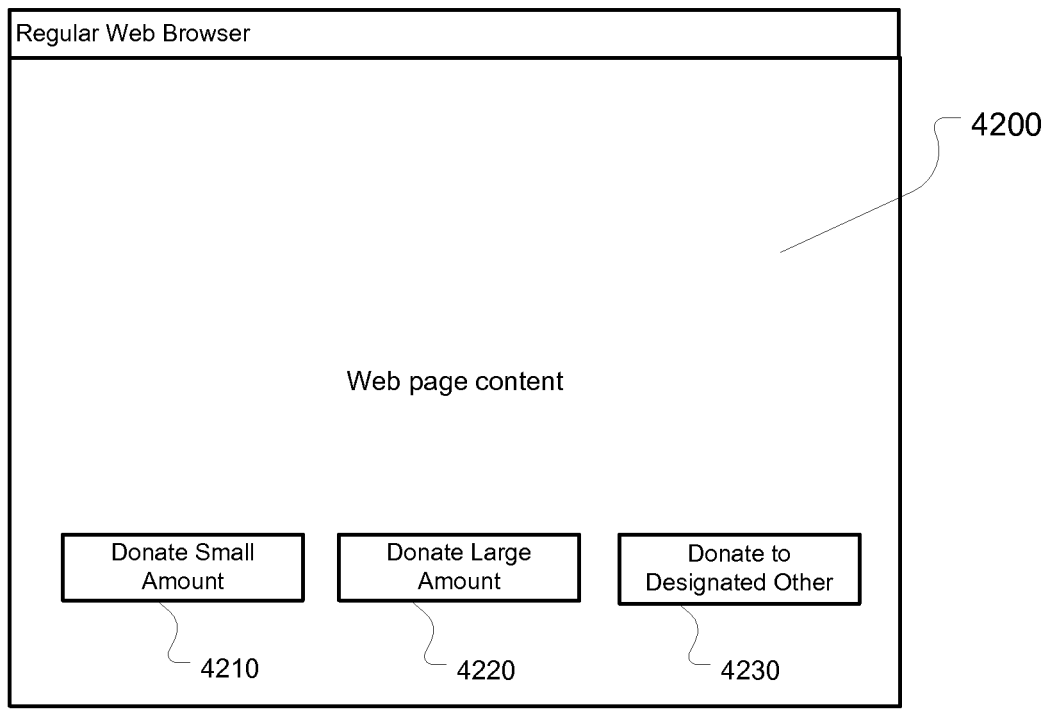
FIG. 4 is an example of a solicitation screen using link icons requesting the user to give a gratuity if they like the site content.

In a first embodiment as depicted in FIG. 2, a user has viewed content on a web site (2200) using their web browser, and is so pleased with the content that they want to give a gratuity to the site's content owner. The site content owner has added a digital tip jar (2210) to the site to receive these gratuities. In this embodiment, the digital "tip jar" is a user interface component that allows a user to give a gratuity, as represented, for example, by a Digital Bearer Instrument (DBI) (2310), or a title object (2320), to the site content owner by dragging and dropping a digital representation of the title over the digital "tip jar" icon (2210) as shown in FIG. 3. In FIG. 3 the user has opened their Digital Wallet (3300), and selected an item to donate (3220). They have dragged the digital representation of the item onto the digital "tip jar" icon (3210). This activates the digital "tip Jar", which is configured with a rule that specifies that items should be deposited into a digital wallet. The activated digital "tip jar" then takes care of transferring the donated item to the site content owner's digital wallet (as specified by the rule), thus completing the transaction. Implementation of drag and drop interfaces for both traditional UI and web interfaces are well understood by those skilled in the art of developing user interface components. In other embodiments, a digital tip jar is a clickable link to a software component that provides the necessary user interface components that support the necessary interface components. One example of the link-based embodiment is depicted in FIG. 4, where there are icons on a web page (4200) representing links to appropriate web content for carrying out the donation transaction (4210, 4220, and 4230) as described below.

A site's content owner may optionally suggest the gratuity desired by publishing the suggestion as part of the digital tip jar. The desired gratuity specification could be in the form of a wish list (where the donor picks a gratuity to donate from the list) or other list of desired titles, or may be in the form of desired rights expressions, or even a representation that is used to generate a title representing the desired gratuity. The desired gratuity may also be specified as a title fragment. In other cases, the desired gratuity may be specified as a scalar amount or a currency range not associated with a specific title or title fragment.

Using various rules, as described above, the digital tip jar may be further configured to reject non-desired gratuities, or to provide different processing of deposited titles based upon the rights they express, their contents, or other attributes associated with each title.

In a relatively simple implementation, the digital tip jar may provide a direct interface to the content owner's in-box or digital wallet, where titles that are "deposited" in the tip jar are added to the content owner's in-box or digital wallet. In other implementations, the titles so deposited may be automatically placed in a digital wallet for use by the content owner, or alternatively may be further processed by a processing system in order to re-record or register the rights or properties represented by the title to the new owner, to automatically exercise some or all of the rights expressed in the title, or for other purposes.

Figure 5:
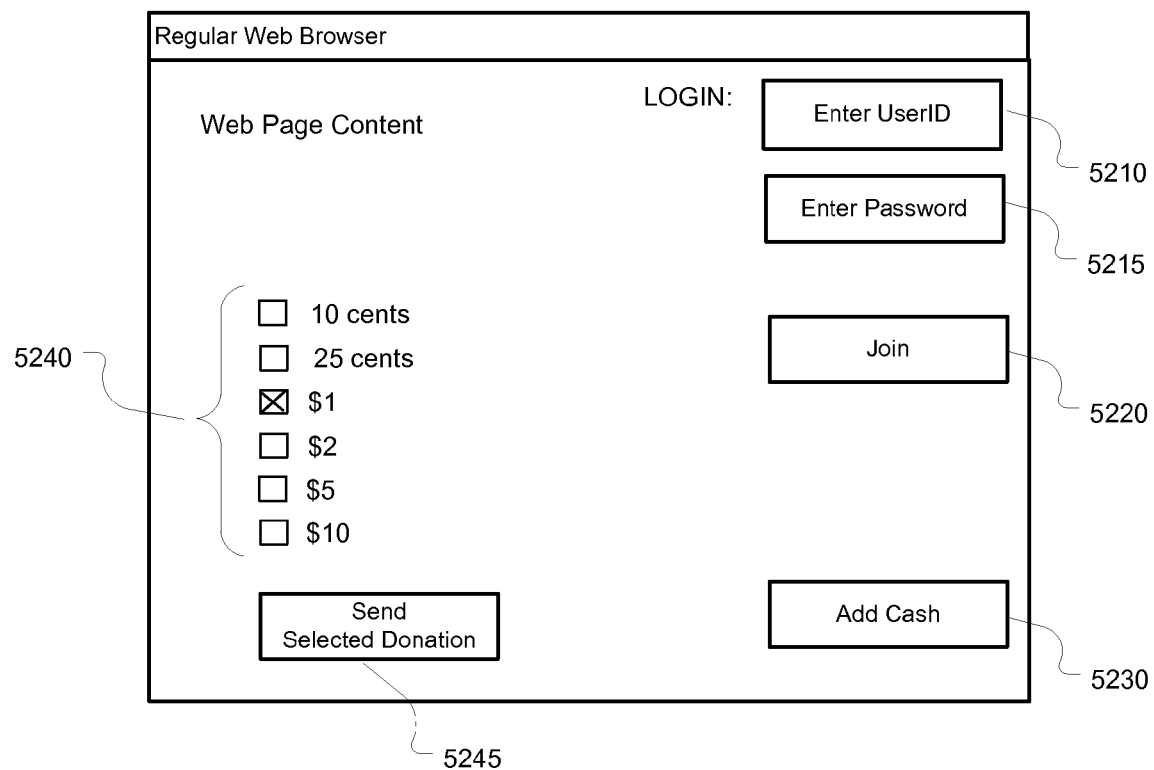
FIG. 5 is an example of a data entry screen shown to the user for the purpose of giving a gratuity.

In one embodiment, the title may represent "digital cash". In cases where the user (giver) already has a digital cash account, they may use their digital cash account as depicted in FIG. 5 to construct a title for deposit into the digital tip jar. If the user already has a Digital Cash account, they may be prompted to authenticate (e.g. they can enter their userid (5210) and PIN or password (5215), or they may use other authentication mechanisms available to them such as a single sign-on, device ownership, or other mechanisms of accessing the digital cash account. In this example, the digital tip jar describes a desired gratuity amount (5240), so the amount of the gratuity is pre-selected (based on the link clicked in FIG. 4), but can be changed if desired. The user then clicks the send icon (5245) to send the gratuity to the site content owner. The application creates a title representing the desired amount of digital cash, and transmits the title to the site content owner using the digital tip jar. If the user does not have a Digital Cash account, the user interface provides a "Join" link (5220) so they can create one. The user interface also provides a link which is used to add cash to an existing account (5230). In alternative embodiments, the title deposited in the "digital tip jar" may represent other digital assets, such as a movie ticket, a ring tone, a song, or any other right or set of rights that may be represented using a title object or DBI.

Figure 6:
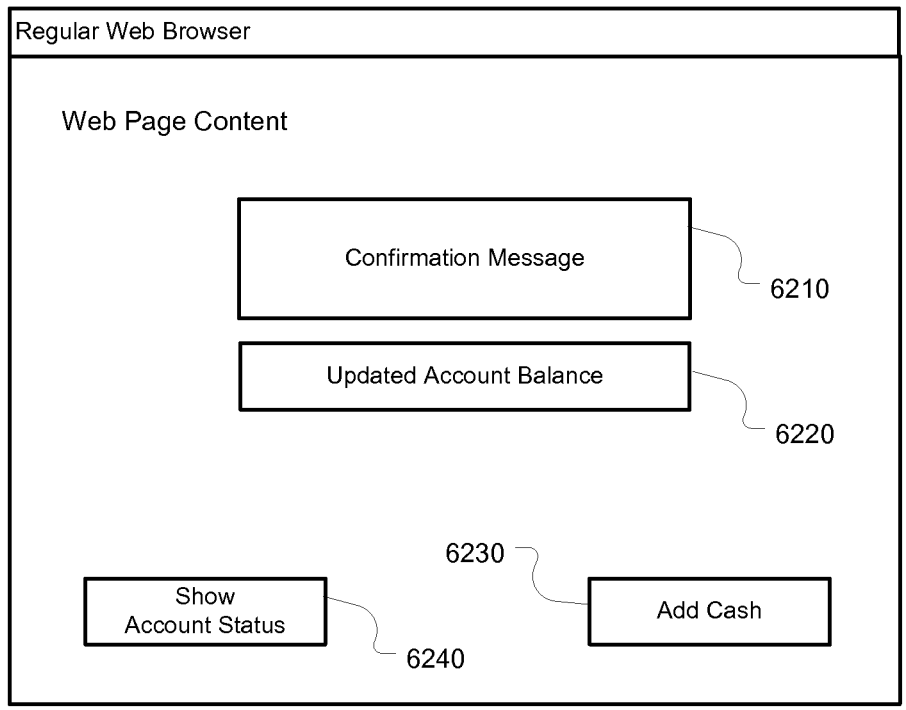
FIG. 6 is an example of an acknowledgment screen shown to the user after they have given a gratuity.

Continuing with the "digital cash" example as depicted in FIG. 6, the user receives a confirmation screen that tells them their gratuity has been sent successfully to the site owner (6210), and informs them of the remaining balance in their Digital Cash account (6220). The user also has the option to view their wallet (6240) or add funds to their account (6230) from this screen. It should be noted that this activity can occur within a DCE, or within one or more components supported within a secure processing environment.

7.2 Donation by E-mail

Figure 7:
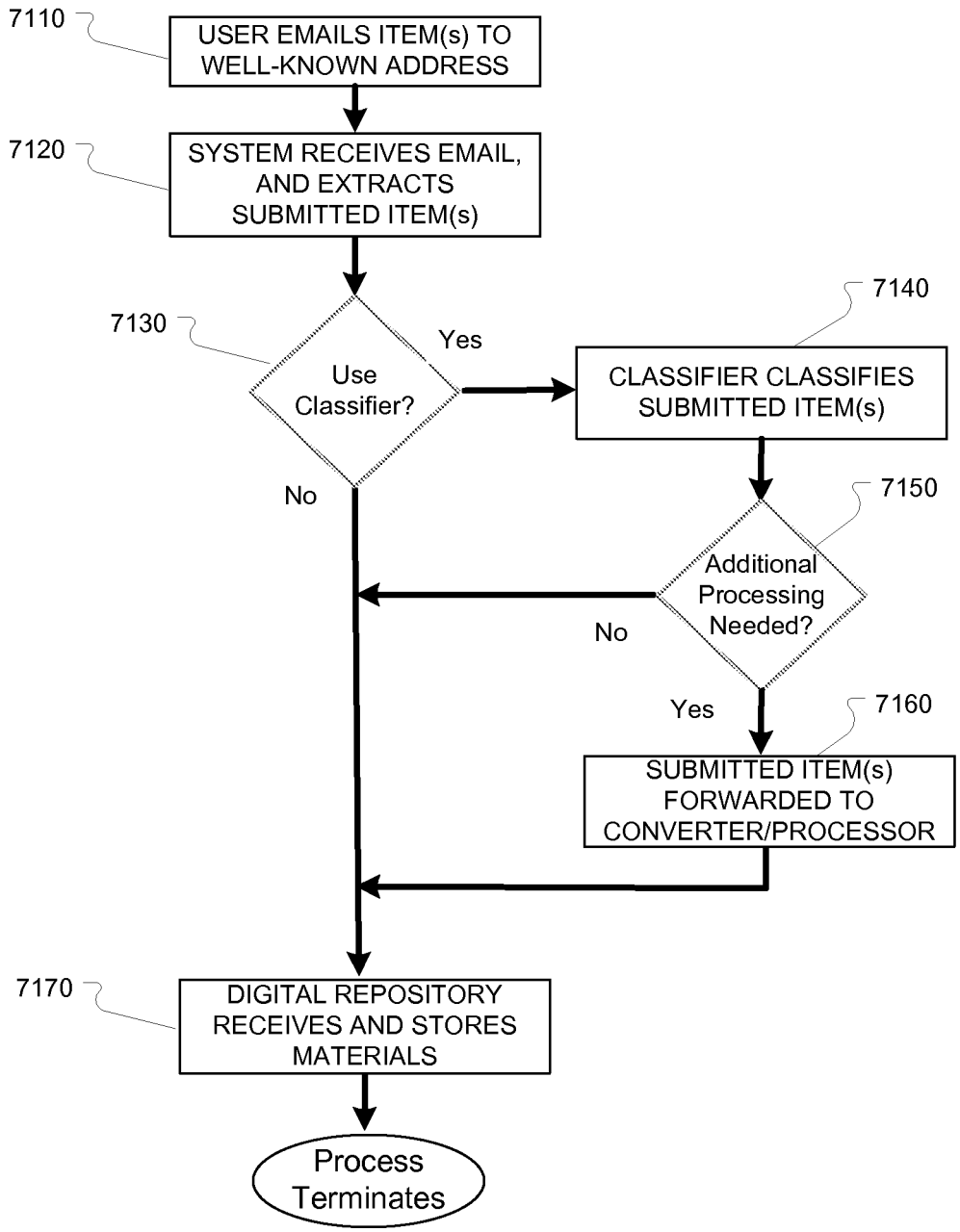
FIG. 7 is a flow chart showing an example of a process of making a donation by email.

This implementation allows a user to send a donated item, or items, by e-mail to a recipient. As shown in the flowchart in FIG. 7, the user e-mails one or more items, such as titles or title materials, MP3s, pictures, digital cash or other digital materials to a well known address (7110).

The receiving system receives the e-mail and associated donation item or items and extracts the donated item or items (7120). The receiving system determines if any of the items are actually references to items, such as URLs, rather than the digital materials comprising the actual items. For any items that are references, the receiving system retrieves the actual items (if so specified in a rule).

In this system the Classifier and Converter/Processor options have been implemented, but in such a manner as to permit them to be disabled. The receiving system therefore checks to see if Classification is enabled for mail to the address in question (7130), and if it is, invokes the Classifier on the received item or items (7140).

The receiving system then checks, for each item, whether conversion or processing is required based upon the specification provided by one or more rules (7150). This decision can be based on the classification of the item, attributes of the item, identification of the item, or upon other criteria such as the items source, with some item types receiving conversion and/or processing (7160), and other types not receiving such treatment.

The received item or items is/are then stored in the Digital Wallet or other appropriate location (7170). Where items are stored may be determined by the type of item. For example, a music file may be stored in the location accessed by a music player, a title may be stored in a title repository, and digital cash may have been redeemed by the additional processing step (7160) and stored in the recipient's bank account.

7.3 Web Page Submission, Items Are Submitted Using HTTP "Post" Function.

Figure 8:
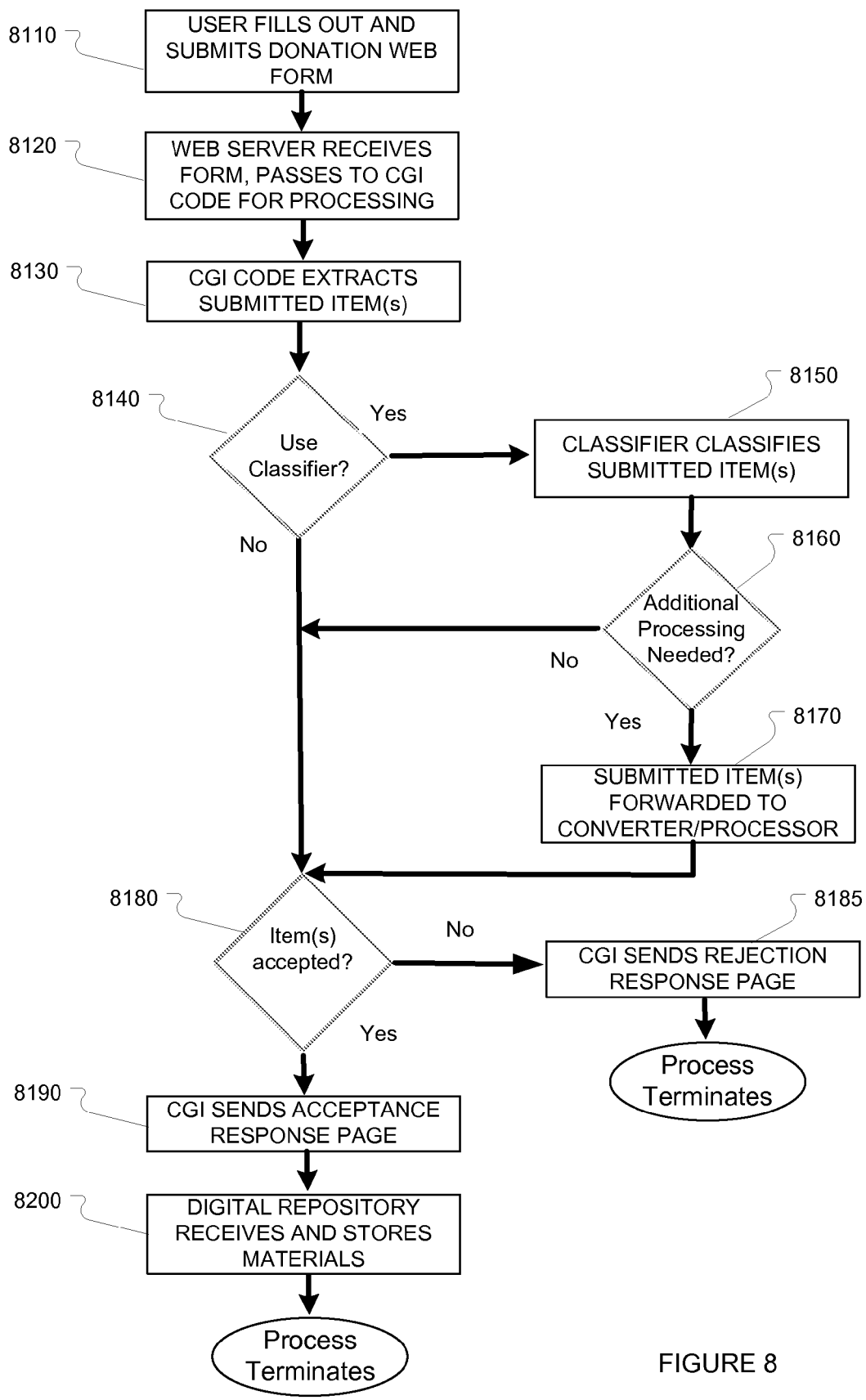
FIG. 8 is a flow chart showing an example of a process of making a donation through a web site using an HTML form.

This implementation allows a user to send a donated item, or items, to a recipient by use of a web form. As shown in the flowchart in FIG. 8, the user browses to the page with the web form, and fills it out, specifying the location of one or more items, such as titles, MP3s, pictures, digital cash or other digital materials to be donated (8110). When the user clicks the "submit" button, the form and items are sent to the web server.

The web server passes the form data and items to a CGI program for processing (8120). In some implementations the web server may incorporate the ability to process donated items and not require external CGI support.

The CGI processor extracts the submitted item or items from the web form data (8130). If the form contains references to items, such as URLs, rather than the digital materials comprising the actual items, the CGI processor retrieves the actual items.

In this system the Classifier and Converter/Processor options have been implemented, but in such a manner as to permit them to be disabled. The receiving system therefore checks to see if Classification is enabled for items received via web form (8140), and if it is, invokes the Classifier on the received item or items (8150). The receiving system then checks, for each item, whether conversion or processing is required (8160). This decision can be based on the classification of the item, with some item types receiving conversion and/or processing (8170), and other types not receiving such treatment.

Depending on the results of the receipt, retrieval, classification, and/or processing of the donated item(s) (8180), the CGI processor sends a response page back to the donor, specifying how each item has been dealt with, whether it was rejected (8185) or accepted (8190) or whether there was a problem in receiving it (8185).

Items which were received and accepted are stored in the Digital Wallet or other appropriate repository (8200). Where items are stored may be determined by the type of item. For example, a music file may be stored in the location accessed by a music player, a title may be stored in a title repository, and digital cash may have been redeemed by the additional processing step (8170) and stored in the recipient's bank account.

7.4 Widget Submission

Figure 9:
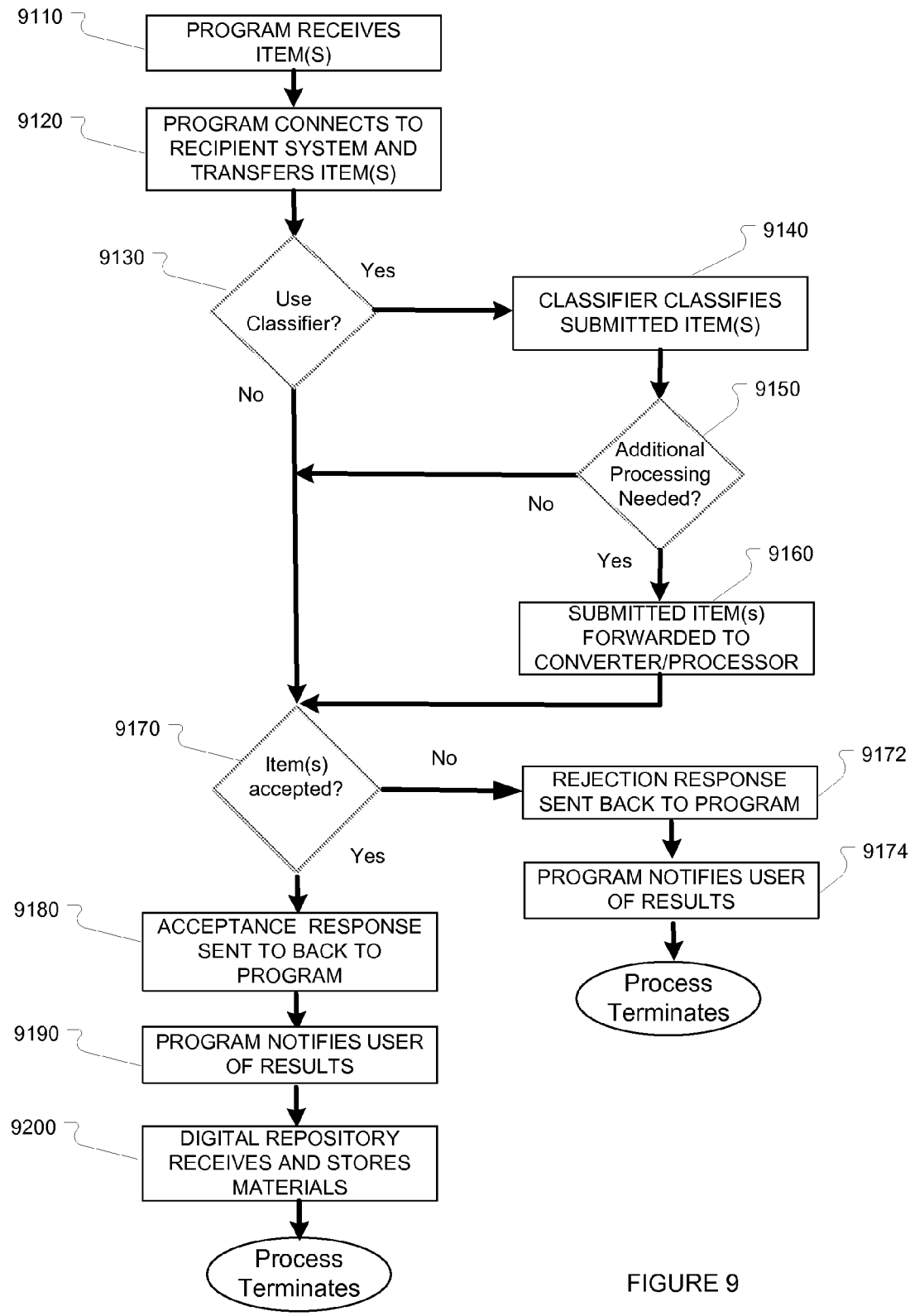
FIG. 9 is a flow chart showing an example of a process of making a donation by using a "widget."

This implementation allows a user to send a donated item, or items, to a recipient by use of a stand-alone program, or applet icon on a web page (widget). The user can specify the items to donate by dragging and dropping, a file search dialog box, or other standard user interface method. As shown in the flowchart in FIG. 9, the user invokes the program or widget, and provides it with the location of one or more items, such as titles, MP3s, pictures, digital cash or other digital materials to be donated (9110).

The receiving server may be a web server, an e-mail server, a specialized donation server, or any other server as determined to be appropriate by those having skill in the art. The program or widget therefore sends e-mail, opens an HTTP session, connects to a well-known port at the proper address, or in some other way connects to the recipient system and transfers the item or items to the receiving server (9120).

The receiving server determines if any of the items are actually references to items, such as URLs, rather than the digital materials comprising the actual items. For any items which are references, the receiving server retrieves the actual items.

In this system the Classifier and Converter/Processor options have been implemented, but in such a manner as to permit them to be disabled. The receiving server therefore checks to see if Classification is enabled for the recipient (9130), and if it is, invokes the Classifier on the received item or items (9140). The receiving server then checks, for each item, whether conversion or processing is required (9150). This decision can be based on the classification of the item, with some item types receiving conversion and/or processing (9160), and other types not receiving such treatment.

Depending on the results of the receipt, retrieval, classification, and/or processing of the donated item(s) (9170), the receiving server sends a response back to the program or widget, specifying how each item has been dealt with, whether it was rejected (9172) or accepted (9180) or whether there was a problem in receiving it (9172). The program or widget notifies the user of the results of the donation (9190, 9174).

Items which were received and accepted are stored in the Digital Wallet or other appropriate repository (9200). Where items are stored may be determined by the type of item. For example, a music file may be stored in the location accessed by a music player, a title may be stored in a title repository, and digital cash may have been redeemed by the additional processing step (9160) and stored in the recipient's bank account.

7.5 Example of MP3 Having Embedded Title

This example shows the processing done for a digital media file bearing an embedded title. The processing is similar regardless of how the item is donated, whether by e-mail, web form, widget or other method. The processing is also similar regardless of whether there were multiple items donated at once, or just a single item.

Figure 10:
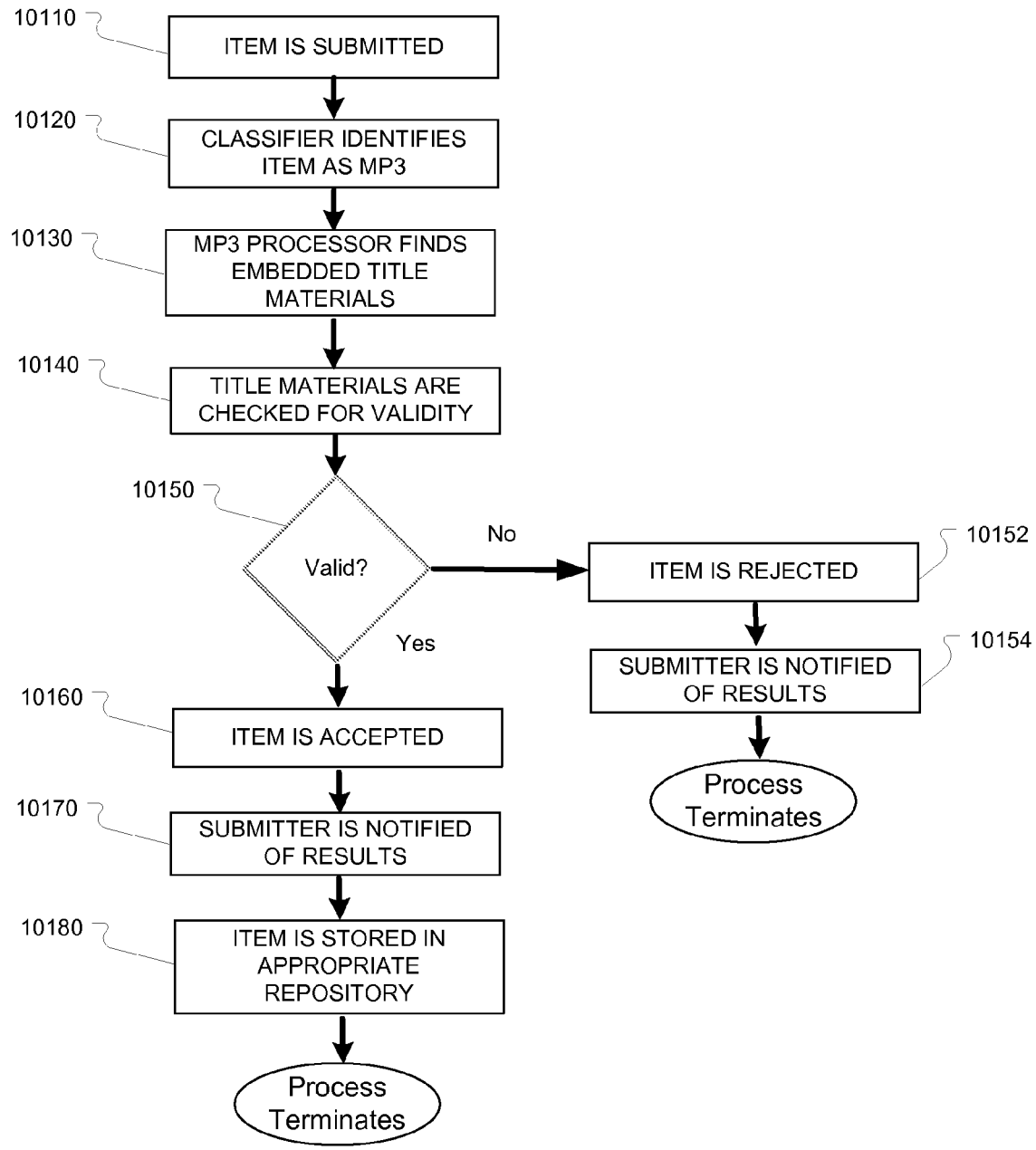
FIG. 10 is a flow chart showing an example of a process of transferring an MP3 file with an embedded title.

As shown in FIG. 10, once the item is donated (10110), and the receiver's processing system has determined that the item is an MP3 file (10120), the receiver's processing system passes the MP3 item to the processor that deals with MP3 files, which determines that there is an embedded title object in the MP3 file (10130).

The MP3 processor uses aspects of the DCS to validate the title object (10140). If the title object specifies a valid title which expresses at last one right which would allow transfer to the recipient, the processor marks the item as acceptable (10160) and the donor is notified of this through the appropriate mechanism (10170) and the item is stored in the appropriate repository (10180). If the title object does not specify a valid title which expresses at last one right which would allow transfer to the recipient, the processor marks the item as unacceptable (10152), the donor is notified of this through the appropriate mechanism (10154) and the item is not stored.

7.6 MP3 Not Having Embedded title

This example shows the processing done for a digital media file that does not bear an embedded title. The processing is similar regardless of how the item is donated, whether by e-mail, web form, widget or other method. The processing is also similar regardless of whether there were multiple items donated at once, or just a single item.

Figure 11:
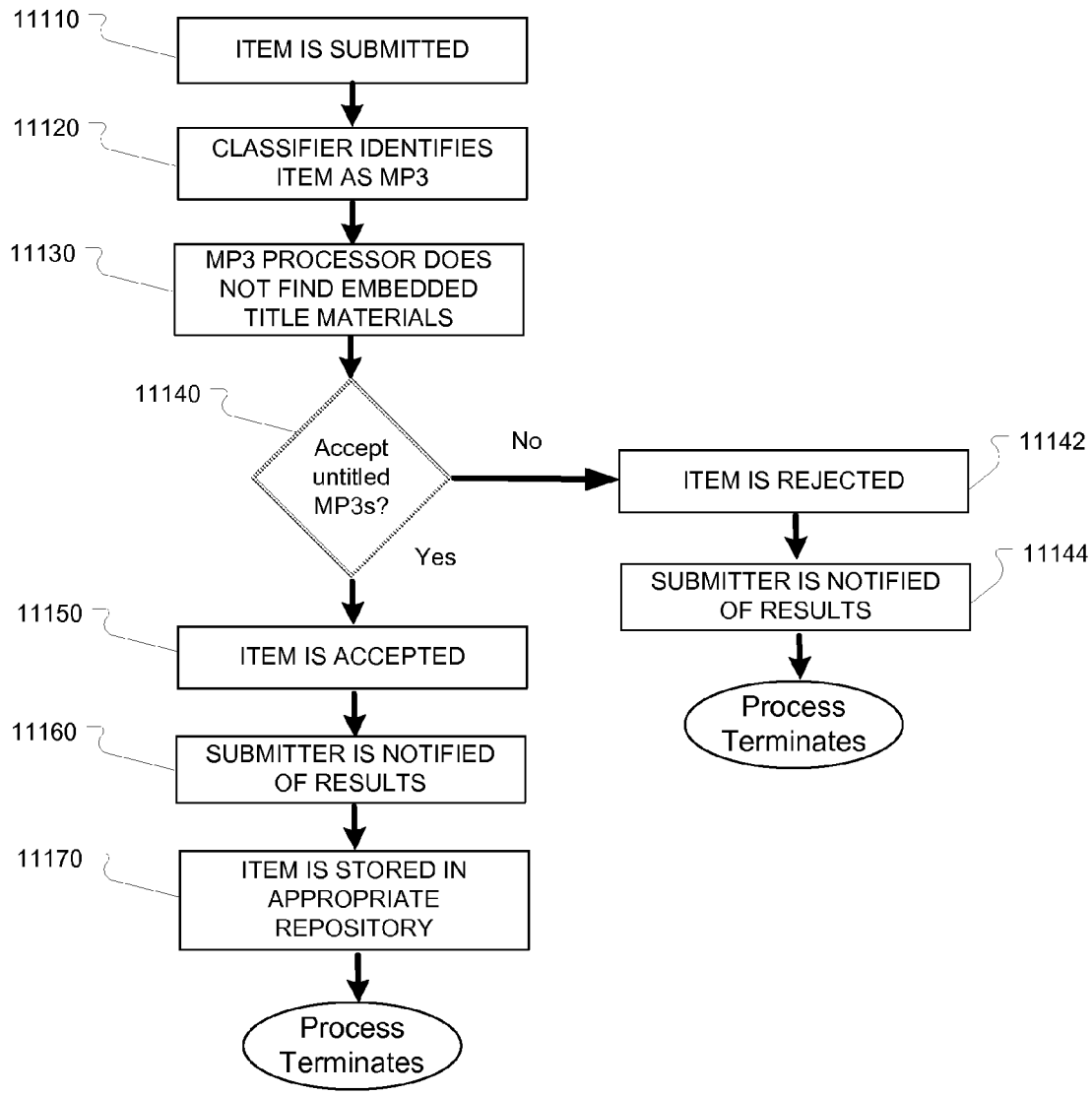
FIG. 11 is a flow chart showing an example of a process of transferring an MP3 file without an embedded title.

As shown in FIG. 11, once the item is donated (11110), and the receiver's processing system has determined that the item is an MP3 file (11120), the receiver's processing system passes the MP3 item to the processor that deals with MP3 files, which determines that there is not an embedded title object in the MP3 file (11130).

If the configuration of the receiver's processing system allows acceptance of untitled materials (11140), the processor marks the item as acceptable (11150) and the donor is notified of this through the appropriate mechanism (11160) and the item is stored in the appropriate repository (11170). If the configuration of the receiver's processing system does not allow acceptance of untitled materials, the processor marks the item as unacceptable (11142), the donor is notified of this through the appropriate mechanism (11144) and the item is not stored.

7.7 Donation of Unrecognized Items

This example shows the processing done for an item which is not of a recognized type. The processing is similar regardless of how the item is donated, whether by e-mail, web form, widget or other method. The processing is also similar regardless of whether there were multiple items donated at once, or just a single item.

Figure 12:
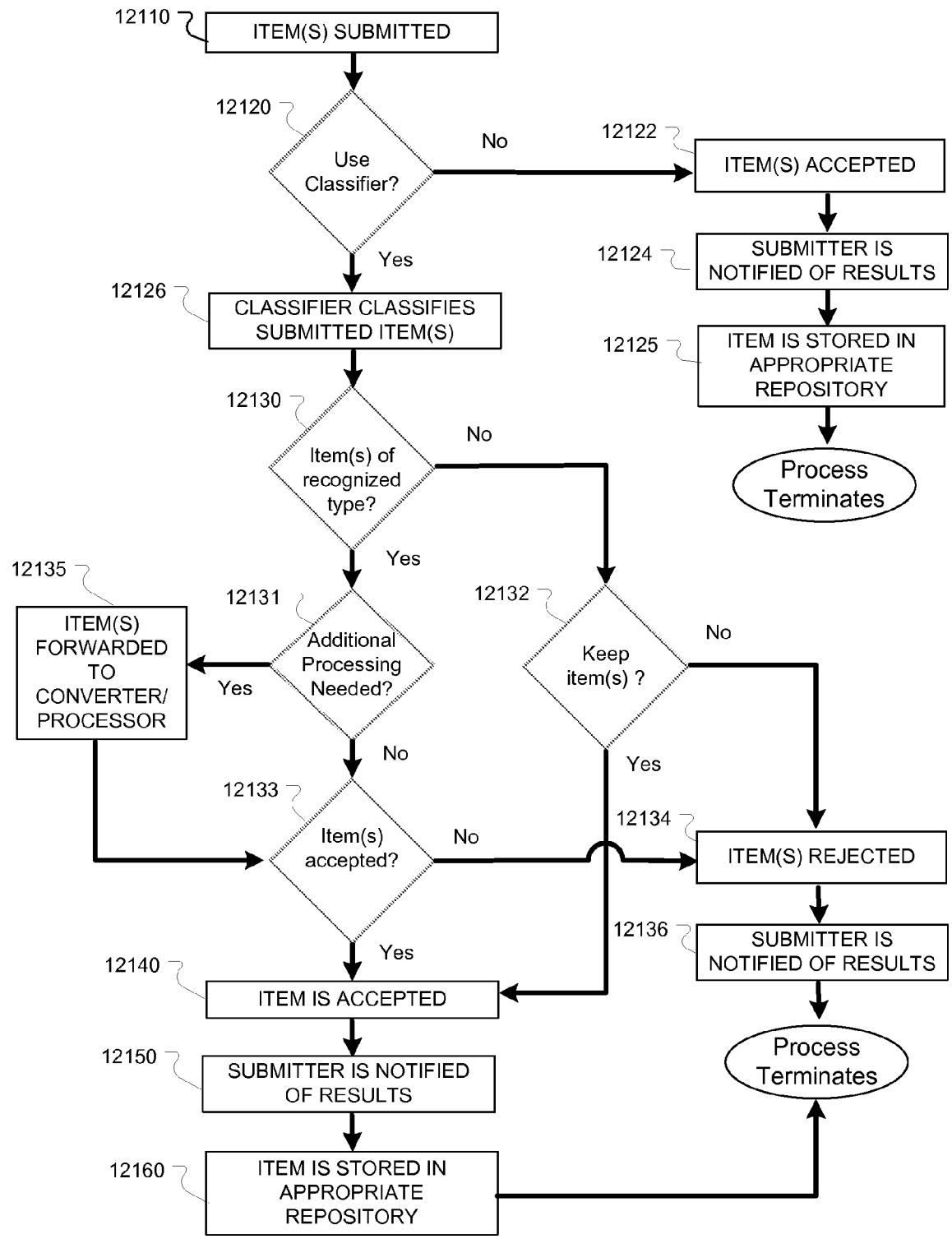
FIG. 12 is a flow chart showing an example of a process of dealing with an item of an unrecognized classification.

As shown in FIG. 12, once the item is donated (12110), the system checks to see if Classification is enabled for this user (12120). If Classification is not enabled, the item is accepted (12122), the donor is informed of this result (12124) and the item is stored in an appropriate repository (12125). If Classification is enabled, the Classifier is invoked to determine the item's type (12126).

If the Classifier recognizes the type of the item (12130), the processor checks for the need for additional processing for the item's type (12131), and performs the processing if needed (12135). If the item is found to be acceptable (12133), the donor is notified (12150) and the item is stored in an appropriate repository (12160). If the item is found to be unacceptable (12133), the item is rejected (12134), the donor is notified of the rejection (12136), and the item is not stored.

If the Classifier does not recognize the type of the item (12130), the configuration of the receiving system is checked to see if items of unrecognized types should be rejected or accepted (12132). If such items are to be rejected (12134), the donor is notified of the rejection (12136), and the item is not stored. If such items are acceptable, the item is marked acceptable (12140), the donor is notified of the acceptance (12150) and the item is stored (12160). For items that are not recognized by the Classifier, the item may be stored in a repository location specifically designated for such items.

Figure 13:
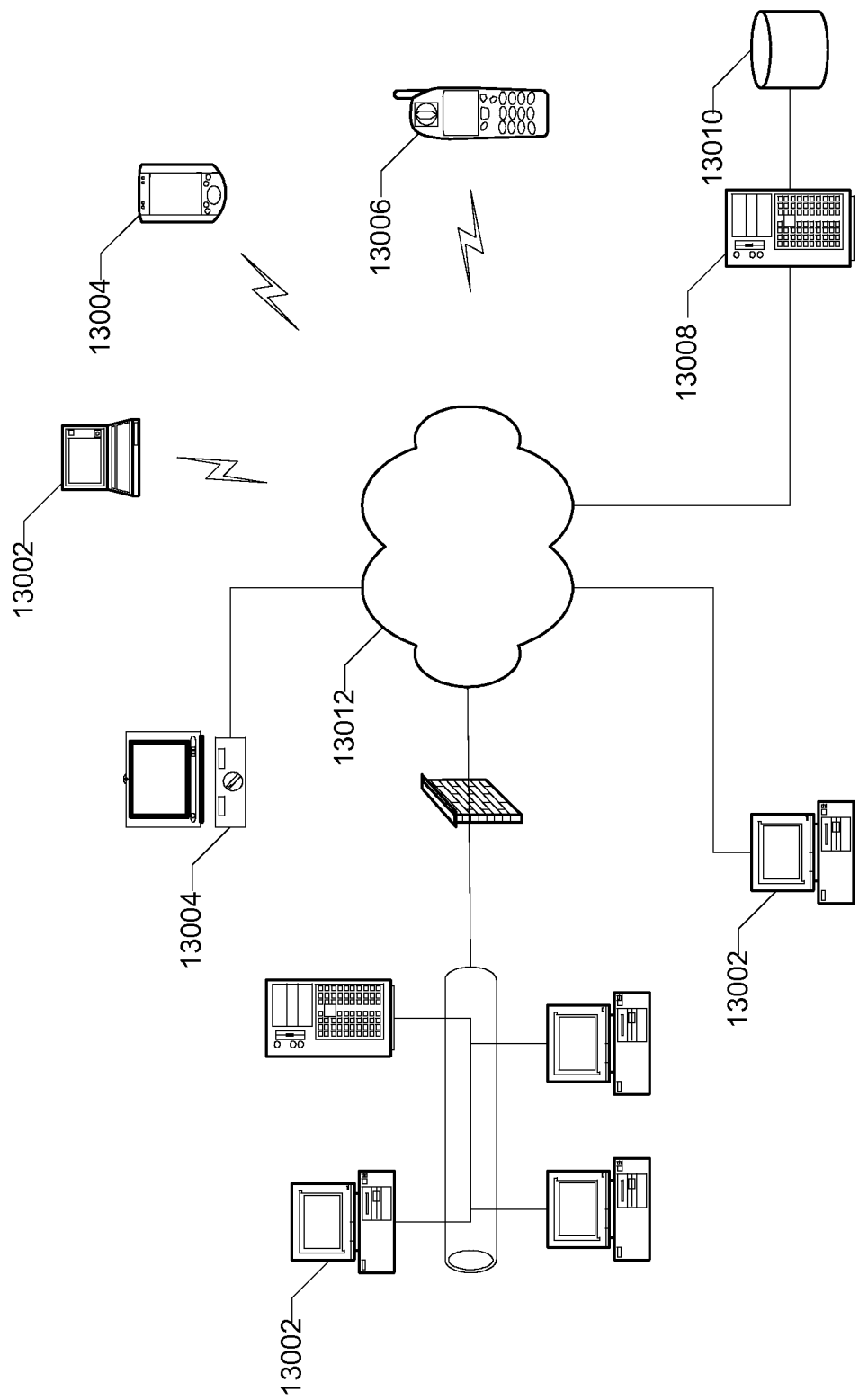
FIG. 13 is a simplified diagram of a network environment in which embodiments of the invention may be implemented.

It should be noted that embodiments of the present invention may be implemented using any of a wide variety of computing systems and platforms and in any network environment in which facilitating donations of digital materials is a useful functionality. For example and as illustrated in FIG. 13, implementations are contemplated in which such donations are facilitated using interfaces on personal computers 13002, media computing platforms 13003 (e.g., gaming platforms, or cable and satellite set top boxes), handheld computing devices (e.g., PDAs) 13004, cell phones 13006, or any other type of communication platform. The logic (e.g., as embodied in computer code or instructions) which controls the various functionalities associated with embodiments of the invention may be resident on such devices, e.g., as part of a browser or other application, or be served up from a remote site, e.g., in a Web page. The providing of suitable interfaces, and the facilitation of donations may be accomplished using one or more platforms (represented by server 13008 and data store 13010) remote from end user devices, either separately or in conjunction with such end user devices. The invention may also be practiced in a wide variety of network environments (represented by network 13012), e.g., TCP/IP-based networks, telecommunications networks, wireless networks, cable networks, etc.

In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

While the invention has been particularly shown and described with reference to specific embodiments thereof, it will be understood by those skilled in the art that changes in the form and details of the disclosed embodiments may be made without departing from the spirit or scope of the invention. For example, the transfer of ownership of a digital asset as enabled by the present invention may precipitate the delivery of additional materials "out-of-band," i.e., in a transaction separate from the transaction by which the transfer of ownership was effected. One application of such an approach could be the delivery of gifts to donors for donating or pledging at different levels during a fundraising drive. Such "out-of-band" deliveries may be effected by a variety of mechanisms and channels including, for example, a separate digital transaction via the same or a different medium (e.g., digital content), or even a physical delivery of a physical object (e.g., a t-shirt, coffee mug, or box set of CDs).

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed:

1. A computer-implemented method for transferring digital assets in a network using a user interface configured to receive digital representations of a plurality of types of digital assets, the method comprising:
   using at least one of one or more computing devices, receiving a digital representation of a first digital asset via the network as a result of a corresponding use of a first instance of the user interface presented on a first client device;
   using at least one of the one or more computing devices, identifying a first type of the first digital asset based on the digital representation of the first digital asset, wherein the digital representation of the first digital asset comprises a digital bearer instrument representing one or more rights relating to the first digital asset;
   using at least one of the one or more computing devices, transmitting the digital bearer instrument to a digital asset processing device via the network, the digital asset processing device being configured to recognize and process the digital bearer instrument to invoke at least one of the one or more rights relating to the first digital asset;
   using at least one of the one or more computing devices, storing the digital bearer instrument in a first storage device associated with a first entity thereby transferring ownership of the one or more rights relating to the first digital asset from a first user associated with the first client device to the first entity;
   using at least one of the one or more computing devices, transmitting a first notification to the first client device via the network, the first notification indicating that ownership of the one or more rights relating to the first digital asset has been transferred to the first entity;
   using at least one of the one or more computing devices, receiving a digital representation of a second digital asset via the network as a result of a corresponding use of a second instance of the user interface presented on a second client device;
   using at least one of the one or more computing devices, identifying a second type of the second digital asset based on the digital representation of the second digital asset, wherein the digital representation of the second digital asset comprises a digital media file;
   using at least one of the one or more computing devices, storing the digital media file in a second storage device associated with a second entity;
   using at least one of the one or more computing devices, transmitting a second notification to the second client device via the network, the second notification indicating that the digital media file has been transferred to the second entity;
   using at least one of the one or more computing devices, receiving a digital representation of a third digital asset via the network as a result of a corresponding use of a third instance of the user interface presented on a third client device;
   using at least one of the one or more computing devices, determining that the third digital asset is an unknown type of digital asset based on the digital representation of the third digital asset;
   using at least one of the one or more computing devices, rejecting the digital representation of the third digital asset; and
   using at least one of the one or more computing devices, transmitting a third notification to the third client device via the network, the third notification indicating that the third digital asset has been rejected.

2. The method of claim 1 wherein the user interface is configured to receive the digital representations of the digital assets via drag and drop operations.

3. The method of claim 1, further comprising:
   using at least one of the one or more computing devices, transmitting the first instance of the user interface to the first client device;
   using at least one of the one or more computing devices, transmitting the second instance of the user interface to the second client device; and
   using at least one of the one or more computing devices, transmitting the third instance of the user interface to the third client device.

4. The method of claim 1 wherein the first, second, and third instances of the user interface are generated locally by the first, second, and third client devices, respectively.

5. The method of claim 1 further comprising converting the digital media file from a first format to a second format.

6. The method of claim 1 further comprising delivering additional materials as a consequence of invoking the one or more rights.

7. The method of claim 6 further wherein the additional materials are delivered in a separate transaction relative to the transfer of ownership of the one or more rights relating to the first digital asset.

8. The method of claim 1 wherein the digital bearer instrument is embedded in another data structure.

9. A system for transferring digital assets using a user interface configured to receive digital representations of a plurality of types of digital assets, the system comprising at least one computing device, the at least one computing device including:
   one or more processors; and
   memory having computer program instructions stored therein configured such that when executed by the one or more processors the computer program instructions cause the at least one computing device to:
   receive a digital representation of a first digital asset as a result of a corresponding use of a first instance of the user interface presented on a first client device;
   identify a first type of a first digital asset based on the digital representation of the first digital asset, wherein the digital representation of the first digital asset comprises a digital bearer instrument representing one or more rights relating to the first digital asset;
   transmit the digital bearer instrument to a digital asset processing device in communication with the system, the digital asset processing device being configured to recognize and process the digital bearer instrument to invoke at least one of the one or more rights relating to the first digital asset;
   store the digital bearer instrument in a first storage device associated with a first entity thereby transferring ownership of the one or more rights relating to the first digital asset to the first entity; and
   transmit a first notification to the first client device, the first notification indicating that ownership of the one or more rights relating to the first digital asset has been transferred to the first entity;

receive a digital representation of a second digital asset as a result of a corresponding use of a second instance of the user interface presented on a second client device;

identify a second type of a second digital asset based on the digital representation of the second digital asset, wherein the digital representation of the second digital asset comprises a digital media file;

store the digital media file in a computer-readable repository associated with a second entity;

transmit a second notification to the second client device, the second notification indicating that the digital media file has been transferred to the second entity;

receive a digital representation of a third digital asset as a result of a corresponding use of a third instance of the user interface presented on a third client device;

determine that a third digital asset is an unknown type of digital asset based on the digital representation of the third digital asset;

reject the digital representation of the third digital asset; and transmit a third notification to the third client device, the third notification indicating that the third digital asset has been rejected.

10. The system of claim 9 wherein the user interface is configured to receive the digital representations of the digital assets via drag and drop operations.

11. The system of claim 9, wherein the computer program instructions are further configured to cause the at least one computing device to:

transmit the first instance of the user interface to the first client device;

transmit the second instance of the user interface to the second client device; and transmit the third instance of the user interface to the third client device.

12. The system of claim 9 wherein the first, second, and third instances of the user interface are generated locally by the first, second, and third client devices, respectively.

13. The system of claim 9 wherein the computer program instructions are further configured to cause the at least one computing device to convert the digital media file from a first format to a second format.

14. The system of claim 9 wherein the computer program instructions are further configured to cause the at least one computing device to receive additional materials as a consequence of invoking the one or more rights.

15. The system of claim 14 further wherein the additional materials are delivered in a separate transaction relative to the transfer of ownership of the one or more rights relating to the first digital asset.

16. The system of claim 9 wherein the digital bearer instrument is embedded in another data structure.

17. A computer program product, comprising at least one non-transitory computer-readable medium having computer program instructions stored therein, the computer program instructions being configured such that, when executed by a computing device, the computer program instructions cause the computing device to:

present a first instance of a user interface on a display of the computing device, the first instance of the user interface being configured to receive digital representations of a plurality of types of digital assets;

receive a digital representation of a first digital asset via the first instance of the user interface;

identify a first type of the first digital asset based on the digital representation of the first digital asset, wherein the digital representation of the first digital asset comprises a digital bearer instrument representing one or more rights relating to the first digital asset;

transmit, via a network, the digital bearer instrument for storage by a first storage device associated with a first entity thereby transferring ownership of the one or more rights relating to the first digital asset from a first user associated with the computing device to the first entity;

present a first notification on the display of the computing device, the first notification indicating that ownership of the one or more rights relating to the first digital asset has been transferred to the first entity;

present a second instance of the user interface on the display of the computing device;

receive a digital representation of a second digital asset via the second instance of the user interface;

identify a second type of the second digital asset based on the digital representation of the second digital asset, wherein the digital representation of the second digital asset comprises a digital media file;

transmit, via the network, the digital media file for storage by a second storage device associated with a second entity;

present a second notification on the display of the computing device, the second notification indicating that the digital media file has been transferred to the second entity;

present a third instance of the user interface on the display of the computing device;

receive a digital representation of a third digital asset via the third instance of the user interface;

determine that the third digital asset is an unknown type of digital asset based on the digital representation of the third digital asset;

reject the digital representation of the third digital asset; and present a third notification on the display of the computing device, the third notification indicating that the third digital asset has been rejected.

* * * * *